(12) United States Patent
Falcao et al.

(10) Patent No.: US 11,657,053 B2
(45) Date of Patent: *May 23, 2023

(54) TEMPORAL OPTIMIZATION OF DATA OPERATIONS USING DISTRIBUTED SEARCH AND SERVER MANAGEMENT

(71) Applicant: Spredfast, Inc., Austin, TX (US)

(72) Inventors: Eric Manuel Falcao, Austin, TX (US); Brett Hoerner, Austin, TX (US); Matthew Swain, Austin, TX (US); Adam McElwee, Austin, TX (US)

(73) Assignee: Spredfast, Inc., Austin, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/332,391

(22) Filed: May 27, 2021

(65) Prior Publication Data
US 2021/0357408 A1 Nov. 18, 2021

Related U.S. Application Data

(63) Continuation of application No. 15/877,381, filed on Jan. 22, 2018, now Pat. No. 11,061,900.

(51) Int. Cl.
| | | |
|---|---|---|
| G06F 16/20 | (2019.01) | |
| G06F 16/2453 | (2019.01) | |
| G06F 16/27 | (2019.01) | |
| G06F 16/2458 | (2019.01) | |
| H04L 67/10 | (2022.01) | |

(52) U.S. Cl.
CPC .... *G06F 16/24542* (2019.01); *G06F 16/2471* (2019.01); *G06F 16/27* (2019.01); *H04L 67/10* (2013.01)

(58) Field of Classification Search
None
See application file for complete search history.

(56) References Cited

U.S. PATENT DOCUMENTS

| | | | |
|---|---|---|---|
| 6,041,311 | A | 3/2000 | Chislenko et al. |
| 6,146,026 | A | 11/2000 | Ushiku |

(Continued)

FOREIGN PATENT DOCUMENTS

| | | | |
|---|---|---|---|
| CN | 102054033 | A | 5/2011 |
| CN | 103177095 | B | 12/2015 |

(Continued)

OTHER PUBLICATIONS

"Craigslist Online Community." Craigslist.org. Jul. 6, 2010.

(Continued)

*Primary Examiner* — Jau Shya Meng
(74) *Attorney, Agent, or Firm* — Kokka & Backus, PC

(57) ABSTRACT

The disclosure describes temporal optimization of data operations using distributed search and server management, including configuring one or more host groups, determining one or more stripes associated with one or more shards distributed among the one or more host groups, receiving a query to retrieve data, evaluating the query to identify a time characteristic associated with the data, identifying a location from which to retrieve the data, and rewriting the query to run on at least one of the one or more host groups at the location using a distributed search platform, the another query being targeted at a host group associated with the class.

20 Claims, 17 Drawing Sheets

(56) References Cited

U.S. PATENT DOCUMENTS

| | | |
|---|---|---|
| 6,385,611 B1 | 5/2002 | Cardona |
| 6,684,239 B1 | 1/2004 | Flepp et al. |
| 6,742,032 B1 | 5/2004 | Castellani et al. |
| 6,871,232 B2 | 3/2005 | Curie et al. |
| 7,031,952 B1 | 4/2006 | Heumann et al. |
| 7,032,030 B1 | 4/2006 | Codignotto |
| 7,222,156 B2 | 5/2007 | Gupta et al. |
| 7,409,710 B1 | 8/2008 | Uchil et al. |
| 7,590,636 B1 | 9/2009 | Heumann et al. |
| 7,606,865 B2 | 10/2009 | Kumar et al. |
| 7,644,057 B2 | 1/2010 | Nelken et al. |
| 7,702,541 B2 | 4/2010 | Black et al. |
| 7,725,492 B2 | 5/2010 | Sittig et al. |
| 7,751,620 B1 | 7/2010 | Cosoi |
| 7,756,926 B2 | 7/2010 | Tseng et al. |
| 7,792,948 B2 | 9/2010 | Zhao et al. |
| 7,818,758 B2 | 10/2010 | Bonet et al. |
| 7,831,912 B2 | 11/2010 | King et al. |
| 7,853,565 B1 | 12/2010 | Liskov |
| 7,979,369 B2 | 7/2011 | Grenier et al. |
| 8,006,187 B1 | 8/2011 | Bailey et al. |
| 8,027,931 B2 | 9/2011 | Kalaboukis |
| 8,082,308 B1 | 12/2011 | Filev |
| 8,131,745 B1 | 3/2012 | Hoffman et al. |
| 8,171,128 B2 | 5/2012 | Zuckerberg et al. |
| 8,200,527 B1 | 6/2012 | Thompson et al. |
| 8,225,376 B2 | 7/2012 | Zuckerberg et al. |
| 8,286,154 B2 | 10/2012 | Kaakani et al. |
| 8,321,300 B1 | 11/2012 | Bockius et al. |
| 8,412,657 B2 | 4/2013 | Grenier et al. |
| 8,437,369 B2 | 5/2013 | Shaikli |
| 8,505,069 B1 | 8/2013 | Solodovnikov et al. |
| 8,606,792 B1 | 12/2013 | Jackson et al. |
| 8,615,442 B1 | 12/2013 | Kapur et al. |
| 8,744,937 B2 | 6/2014 | Seubert et al. |
| 8,752,041 B2 | 6/2014 | Akiyoshi et al. |
| 8,769,417 B1 | 7/2014 | Robinson et al. |
| 8,813,125 B2 | 8/2014 | Reisman |
| 8,825,515 B1 | 9/2014 | Hanson |
| 8,886,580 B2 | 11/2014 | Grenier et al. |
| 8,892,524 B1 | 11/2014 | Lee et al. |
| 8,943,069 B2 | 1/2015 | Heumann et al. |
| 8,972,428 B2 | 3/2015 | Dicker et al. |
| 9,021,361 B1 | 4/2015 | Pettinati et al. |
| 9,105,044 B2 | 8/2015 | Wu |
| 9,131,382 B1 | 9/2015 | Johns |
| 9,141,997 B2 | 9/2015 | Gaedcke et al. |
| 9,143,478 B2 | 9/2015 | Ramaswamy |
| 9,229,702 B1 | 1/2016 | Kapulkin et al. |
| 9,251,360 B2 | 2/2016 | Meyer et al. |
| 9,282,098 B1 | 3/2016 | Hitchcock et al. |
| 9,286,102 B1 | 3/2016 | Harel et al. |
| 9,311,683 B1 | 4/2016 | Saylor et al. |
| 9,325,696 B1 | 4/2016 | Balfanz et al. |
| 9,338,186 B2 | 5/2016 | Wollenstein et al. |
| 9,369,454 B2 | 6/2016 | Porzio et al. |
| 9,378,295 B1 | 6/2016 | Marra et al. |
| 9,483,802 B2 | 11/2016 | Gaedcke et al. |
| 9,501,746 B2 | 11/2016 | Prakash |
| 9,509,742 B2 | 11/2016 | Gordon |
| 9,514,459 B1 | 12/2016 | Doshi et al. |
| 9,519,723 B2 | 12/2016 | Lorenz et al. |
| 9,596,206 B2 | 3/2017 | Bueno et al. |
| 9,619,531 B2 | 4/2017 | Wu |
| 9,654,450 B2 | 5/2017 | Ford et al. |
| 9,756,098 B2 | 9/2017 | Kazerani et al. |
| 9,787,664 B1 | 10/2017 | Subbiah et al. |
| 9,800,639 B2 | 10/2017 | Gordon |
| 9,953,063 B2 | 4/2018 | Spasojevic et al. |
| 10,084,838 B2 | 9/2018 | Gordon et al. |
| 10,142,386 B2 | 11/2018 | Gordon |
| 10,178,173 B2 | 1/2019 | Kadowaki et al. |
| 10,180,971 B2 | 1/2019 | Bhave et al. |
| 10,188,905 B2 | 1/2019 | Dohlen |
| 10,204,344 B2 | 2/2019 | Gaedcke et al. |
| 10,204,383 B2 | 2/2019 | Gaedcke et al. |
| 10,264,042 B2 | 4/2019 | Gordon |
| 10,264,073 B2 | 4/2019 | Kadowaki et al. |
| 10,268,726 B1 * | 4/2019 | Schiesser ............... G06F 16/22 |
| 10,284,723 B1 | 5/2019 | Neuer, III et al. |
| 10,346,449 B2 | 7/2019 | Senftleber et al. |
| 10,417,180 B1 | 9/2019 | Patwardhan |
| 10,430,894 B2 | 10/2019 | Wu |
| 10,489,866 B2 | 11/2019 | Gaedcke et al. |
| 10,491,490 B2 | 11/2019 | Sridhar et al. |
| 10,497,069 B2 | 12/2019 | Gaedcke et al. |
| 10,594,773 B2 | 3/2020 | Falcao et al. |
| 10,601,937 B2 | 3/2020 | Holzband et al. |
| 10,785,222 B2 | 9/2020 | Senftleber et al. |
| 10,855,657 B2 | 12/2020 | Senftleber et al. |
| 10,867,131 B2 | 12/2020 | Scott et al. |
| 10,902,462 B2 | 1/2021 | Savage et al. |
| 10,931,540 B2 | 2/2021 | Davis et al. |
| 10,956,459 B2 | 3/2021 | Senftleber et al. |
| 10,999,278 B2 | 5/2021 | Senftleber et al. |
| 11,050,704 B2 | 6/2021 | Senftleber et al. |
| 11,061,900 B2 | 7/2021 | Falcao et al. |
| 11,087,261 B1 | 8/2021 | Basu et al. |
| 2001/0025253 A1 | 9/2001 | Heintz et al. |
| 2001/0037469 A1 | 11/2001 | Gupta et al. |
| 2001/0042087 A1 | 11/2001 | Kephart et al. |
| 2001/0047290 A1 | 11/2001 | Petras et al. |
| 2002/0010746 A1 | 1/2002 | Jilk et al. |
| 2002/0049793 A1 | 4/2002 | Okumura et al. |
| 2002/0070953 A1 | 6/2002 | Barg et al. |
| 2002/0105545 A1 | 8/2002 | Carter et al. |
| 2002/0144156 A1 | 10/2002 | Copeland |
| 2003/0005103 A1 | 1/2003 | Narad et al. |
| 2003/0028525 A1 | 2/2003 | Santos et al. |
| 2003/0078959 A1 | 4/2003 | Yeung et al. |
| 2003/0128203 A1 | 7/2003 | Marshall et al. |
| 2003/0135565 A1 | 7/2003 | Estrada |
| 2003/0187871 A1 | 10/2003 | Amano et al. |
| 2003/0225850 A1 | 12/2003 | Teague |
| 2004/0049673 A1 | 3/2004 | Song et al. |
| 2004/0073666 A1 | 4/2004 | Foster et al. |
| 2004/0133697 A1 | 7/2004 | Mamaghani et al. |
| 2004/0174397 A1 | 9/2004 | Cereghini et al. |
| 2005/0060643 A1 | 3/2005 | Glass et al. |
| 2005/0074126 A1 | 4/2005 | Stanko |
| 2005/0132348 A1 | 6/2005 | Meulemans et al. |
| 2005/0206644 A1 | 9/2005 | Kincaid |
| 2005/0283614 A1 | 12/2005 | Hardt |
| 2006/0010215 A1 | 1/2006 | Clegg et al. |
| 2006/0036685 A1 | 2/2006 | Canning et al. |
| 2006/0129602 A1 | 6/2006 | Witriol et al. |
| 2006/0143307 A1 | 6/2006 | Codignotto |
| 2006/0155581 A1 | 7/2006 | Eisenberger et al. |
| 2006/0185021 A1 | 8/2006 | Dujari et al. |
| 2006/0206578 A1 | 9/2006 | Heidloff et al. |
| 2006/0294196 A1 | 12/2006 | Feirouz et al. |
| 2007/0083536 A1 | 4/2007 | Darnell et al. |
| 2007/0118889 A1 | 5/2007 | Fredell |
| 2007/0136354 A1 | 6/2007 | Chen |
| 2007/0171716 A1 | 7/2007 | Wright et al. |
| 2007/0220029 A1 | 9/2007 | Jones et al. |
| 2007/0226177 A1 | 9/2007 | Barsness et al. |
| 2007/0240119 A1 | 10/2007 | Ducheneaut et al. |
| 2007/0282800 A1 | 12/2007 | England et al. |
| 2007/0286528 A1 | 12/2007 | Podilchuk |
| 2007/0289006 A1 | 12/2007 | Ramachandran et al. |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0201344 A1 | 8/2008 | Levergood et al. |

(56) References Cited

U.S. PATENT DOCUMENTS

| | | |
|---|---|---|
| 2008/0215591 A1 | 9/2008 | Howard et al. |
| 2008/0221870 A1 | 9/2008 | Attardi et al. |
| 2008/0225848 A1 | 9/2008 | Pilon et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Ayloo |
| 2009/0300036 A1 | 12/2009 | Nagasaki |
| 2010/0071052 A1 | 3/2010 | Mao et al. |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0174813 A1 | 7/2010 | Hildreth et al. |
| 2010/0205663 A1 | 8/2010 | Ward et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0257117 A1 | 10/2010 | Shvadron et al. |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0293560 A1 | 11/2010 | Bland et al. |
| 2010/0306122 A1 | 12/2010 | Shaffer |
| 2010/0306528 A1 | 12/2010 | Andress et al. |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2011/0302653 A1 | 12/2011 | Frantz et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0131653 A1 | 5/2012 | Pasquero et al. |
| 2012/0150759 A1 | 6/2012 | Tarjan |
| 2012/0158632 A1 | 6/2012 | Grenier et al. |
| 2012/0195422 A1 | 8/2012 | Famous |
| 2012/0198197 A1 | 8/2012 | Gladwin et al. |
| 2012/0208568 A1 | 8/2012 | Cooley |
| 2012/0210119 A1 | 8/2012 | Baxter et al. |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0317198 A1 | 12/2012 | Patton et al. |
| 2013/0006403 A1 | 1/2013 | Moore et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0126042 A1 | 5/2013 | Dewald et al. |
| 2013/0138428 A1 | 5/2013 | Chandramouli et al. |
| 2013/0138742 A1 | 5/2013 | Dziubinski |
| 2013/0159472 A1 | 6/2013 | Newton et al. |
| 2013/0198260 A1 | 8/2013 | Dow et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0235069 A1 | 9/2013 | Ubillos et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332262 A1 | 12/2013 | Hunt et al. |
| 2013/0332263 A1 | 12/2013 | Vora et al. |
| 2013/0346872 A1 | 12/2013 | Scott et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |
| 2014/0040377 A1 | 2/2014 | Friedman et al. |
| 2014/0040993 A1 | 2/2014 | Lorenzo et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0075004 A1 | 3/2014 | Dusen et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0189808 A1 | 7/2014 | Mahaffey et al. |
| 2014/0200989 A1 | 7/2014 | Kassko et al. |
| 2014/0222834 A1 | 8/2014 | Parikh et al. |
| 2014/0223527 A1 | 8/2014 | Bortz et al. |
| 2014/0244621 A1 | 8/2014 | Lindsay |
| 2014/0278785 A1 | 9/2014 | Gaedcke et al. |
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0337953 A1 | 11/2014 | Banatwala et al. |
| 2014/0358911 A1 | 12/2014 | McCarthy et al. |
| 2015/0006708 A1 | 1/2015 | Banke et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0067160 A1 | 3/2015 | Sridhar et al. |
| 2015/0095307 A1 | 4/2015 | Bensberg et al. |
| 2015/0100537 A1 | 4/2015 | Grieves et al. |
| 2015/0112918 A1 | 4/2015 | Zheng et al. |

(56) References Cited

U.S. PATENT DOCUMENTS

| | | |
|---|---|---|
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0142748 A1 | 5/2015 | Gottemukkula et al. |
| 2015/0161211 A1 | 6/2015 | Patel et al. |
| 2015/0170294 A1 | 6/2015 | Goyal et al. |
| 2015/0188907 A1 | 7/2015 | Khalid et al. |
| 2015/0193504 A1 | 7/2015 | Naidu et al. |
| 2015/0244706 A1 | 8/2015 | Grajek et al. |
| 2015/0281227 A1 | 10/2015 | Ivey et al. |
| 2015/0286643 A1 | 10/2015 | Kumar et al. |
| 2015/0288522 A1 | 10/2015 | McCoy et al. |
| 2015/0295869 A1 | 10/2015 | Li et al. |
| 2015/0310018 A1 | 10/2015 | Fan et al. |
| 2015/0310020 A1 | 10/2015 | Brav et al. |
| 2015/0310571 A1 | 10/2015 | Brav et al. |
| 2015/0312200 A1 | 10/2015 | Brav et al. |
| 2015/0334102 A1 | 11/2015 | Haugsnes |
| 2015/0347616 A1 | 12/2015 | Levi et al. |
| 2015/0381552 A1 | 12/2015 | Vijay et al. |
| 2016/0019628 A1 | 1/2016 | Udumudi et al. |
| 2016/0021097 A1 | 1/2016 | Shrotri |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1 | 2/2016 | Calistri-Yeh |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1 | 5/2016 | Anandhavelu et al. |
| 2016/0151704 A1 | 6/2016 | Wu |
| 2016/0164863 A1 | 6/2016 | Hitchcock et al. |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0212100 A1 | 7/2016 | Banerjee |
| 2016/0255034 A1 | 9/2016 | Yuan |
| 2016/0269344 A1 | 9/2016 | Anders et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0335572 A1 | 11/2016 | Bennett et al. |
| 2016/0352667 A1 | 12/2016 | Pickett et al. |
| 2016/0378826 A1* | 12/2016 | Bensberg .......... G06F 16/24552 707/721 |
| 2017/0046112 A1 | 2/2017 | Keller et al. |
| 2017/0048237 A1 | 2/2017 | Pfitzmann et al. |
| 2017/0061248 A1 | 3/2017 | Ryan, Jr. et al. |
| 2017/0132276 A1 | 5/2017 | Saurabh et al. |
| 2017/0154356 A1 | 6/2017 | Trevisiol et al. |
| 2017/0154366 A1 | 6/2017 | Turgeman |
| 2017/0177562 A1 | 6/2017 | Scott et al. |
| 2017/0180294 A1 | 6/2017 | Milligan et al. |
| 2017/0193546 A1 | 7/2017 | Bennett et al. |
| 2017/0255536 A1 | 9/2017 | Weissinger et al. |
| 2017/0264619 A1 | 9/2017 | Narayanaswamy et al. |
| 2017/0300490 A1 | 10/2017 | Kachemir et al. |
| 2017/0344748 A1 | 11/2017 | Ghani et al. |
| 2017/0366636 A1 | 12/2017 | Wang et al. |
| 2018/0027075 A1 | 1/2018 | Schoeffler et al. |
| 2018/0041336 A1 | 2/2018 | Keshava et al. |
| 2018/0053114 A1 | 2/2018 | Adjaoute |
| 2018/0081983 A1 | 3/2018 | Carru et al. |
| 2018/0089328 A1* | 3/2018 | Bath .......... G06F 16/22 |
| 2018/0091468 A1 | 3/2018 | Yong et al. |
| 2018/0097802 A1 | 4/2018 | Lander et al. |
| 2018/0115473 A1 | 4/2018 | Sridhar et al. |
| 2018/0144389 A1 | 5/2018 | Fredrich et al. |
| 2018/0152471 A1 | 5/2018 | Jakobsson |
| 2018/0211285 A1 | 7/2018 | Todasco et al. |
| 2018/0219830 A1 | 8/2018 | O'Brien et al. |
| 2018/0267951 A1 | 9/2018 | Moah et al. |
| 2018/0278503 A1 | 9/2018 | Carey et al. |
| 2018/0293607 A1 | 10/2018 | Huddleston et al. |
| 2018/0295137 A1 | 10/2018 | Zager et al. |
| 2018/0329565 A1 | 11/2018 | Yeung et al. |
| 2018/0332079 A1 | 11/2018 | Ashley et al. |
| 2018/0337871 A1 | 11/2018 | Matta et al. |
| 2018/0337907 A1 | 11/2018 | Bhansali et al. |
| 2018/0337910 A1 | 11/2018 | Gustavson et al. |
| 2018/0367484 A1 | 12/2018 | Rodriguez et al. |
| 2018/0374374 A1 | 12/2018 | Watson et al. |
| 2019/0057204 A1 | 2/2019 | Marcovecchio et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2019/0171753 A1* | 6/2019 | Teng ............... G06F 16/285 |
| 2019/0228093 A1 | 7/2019 | Falcao et al. |
| 2019/0230151 A1 | 7/2019 | Falcao et al. |
| 2019/0245751 A1 | 8/2019 | Wong |
| 2019/0306248 A1 | 10/2019 | Swarangi et al. |
| 2019/0347984 A1 | 11/2019 | Hintermeister |
| 2019/0354709 A1 | 11/2019 | Brinskelle |
| 2020/0007530 A1 | 1/2020 | Abdul et al. |
| 2020/0051120 A1 | 2/2020 | Senftleber et al. |
| 2020/0053094 A1 | 2/2020 | Kaube et al. |
| 2020/0099676 A1 | 3/2020 | Desarda et al. |
| 2020/0104478 A1 | 4/2020 | Chauhan |
| 2020/0120068 A1 | 4/2020 | Senftleber et al. |
| 2020/0120095 A1 | 4/2020 | Senftleber et al. |
| 2020/0120096 A1 | 4/2020 | Senftleber et al. |
| 2020/0120167 A1 | 4/2020 | Senftleber et al. |
| 2020/0151829 A1 | 5/2020 | Wu |
| 2020/0184575 A1 | 6/2020 | Gaedcke et al. |
| 2020/0258091 A1 | 8/2020 | Gaedcke et al. |
| 2020/0287957 A1 | 9/2020 | Falcao et al. |
| 2020/0329110 A1 | 10/2020 | Holzband et al. |
| 2020/0358755 A1 | 11/2020 | Abdul et al. |
| 2020/0366564 A1 | 11/2020 | Davis et al. |
| 2021/0119967 A1 | 4/2021 | Senftleber et al. |
| 2021/0174391 A1 | 6/2021 | Savage et al. |
| 2021/0176136 A1 | 6/2021 | Davis et al. |
| 2021/0226952 A1 | 7/2021 | Senftleber et al. |
| 2021/0250341 A1 | 8/2021 | Senftleber et al. |
| 2021/0256041 A1 | 8/2021 | Senftleber et al. |
| 2021/0328961 A1 | 10/2021 | Senftleber et al. |

FOREIGN PATENT DOCUMENTS

| | | |
|---|---|---|
| EP | 2857993 B1 | 8/2017 |
| WO | 2009047674 A2 | 4/2009 |
| WO | 2013158839 A1 | 10/2013 |
| WO | 2014089460 A2 | 6/2014 |
| WO | 2014153463 A3 | 1/2015 |
| WO | 2015013436 A2 | 1/2015 |
| WO | 2019075284 A2 | 4/2019 |
| WO | 2019144159 A1 | 7/2019 |
| WO | 2020232311 A1 | 11/2020 |

OTHER PUBLICATIONS

Ahmed, Saba, Final Office Action dated Jun. 29, 2016 for U.S. Appl. No. 14/098,492.

Ahmed, Saba, Non-Final Office Action dated Nov. 19, 2015 for U.S. Appl. No. 14/098,492.

Anicas, Mitchell; An Introduction to OAuth 2, DigitalOcean, Published Jul. 21, 2014, Retrieved Jan. 29, 2021.

Antoniades et al., "we.b: The web of short URLs," Apr. 2011, Proceedings of the 20th International Conference on World Wide Web, Mar. 28-Apr. 1, 2011, Hyderabad, India, pp. 715-724 (Year: 2011).

Arentz et al., Classifying offensive sites based on image content [online], Computer Vision and Image Understanding 94, 295-310,

(56) References Cited

OTHER PUBLICATIONS

2004, Retrieved from the Internet: https://www.sciencedirect.com/science/article/abs/pii/S1077314203001875.

Bista, Sanat Kumar et al., "Using Gamification in an Online Community," CSIRO ITC Centre, Conference Paper, 2012.

Blaufeld, Justin R., Final Office Action dated Mar. 24, 2016 for U.S. Appl. No. 14/098,501.

Blaufeld, Justin R., Non-Final Office Action dated Sep. 24, 2015 for U.S. Appl. No. 14/098,501.

Bostock, Mike, Sankey Diagram, available at http://bost.ocks.org/mike/sankey, published May 21, 2012, 1 pg.

Brown Jr., Nathan H., Final Office Action dated Mar. 29, 2011 for U.S. Appl. No. 11/971,856.

Brown Jr., Nathan H., Non-Final Office Action dated Jun. 6, 2012 for U.S. Appl. No. 13/167,482.

Brown Jr., Nathan H., Non-Final Office Action dated Mar. 24, 2014 for U.S. Appl. No. 13/780,487.

Brown Jr., Nathan H., Non-Final Office Action dated Nov. 26, 2010 for U.S. Appl. No. 11/971,856.

Bui, Hanh Thi Minh, Non-Final Office Action dated Mar. 13, 2015 for U.S. Appl. No. 14/012,978.

Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].

Chung, Mong-Shune, Non-Final Office Action dated Jan. 29, 2016 for U.S. Appl. No. 14/098,505.

Constine, Josh, "Facebook tests notification unsubscribe button for feed posts," Aug. 9, 2010. http://www.adweek.com/socialtime/unsubscribe-button-posts/244868.

Dagnew, Saba, Final Office Action dated Feb. 12, 2020 for U.S. Appl. No. 15/581,795.

Dagnew, Saba, Non-Final Office Action for U.S. Appl. No. 15/581,795 dated Sep. 16, 2019.

Dinh, Khanh Q., Non-Final Office Action dated Mar. 17, 2021 for U.S. Appl. No. 16/820,697.

Dinh, Khanh Q., Notice of Allowance and Fee(s) Due dated Apr. 16, 2021 for U.S. Appl. No. 16/820,697.

Dinh, Khanh Q., Notice of Allowance and Fee(s) Due dated Oct. 29, 2019 for U.S. Appl. No. 15/877,379.

Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].

Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.

Falcao et al., U.S. Appl. No. 15/877,379, filed Jan. 22, 2018 and entitled, "Temporal Optimization of Data Operations Using Distributed Search and Server Management."

Falcao et al., U.S. Appl. No. 15/877,381, filed Jan. 22, 2018 and entitled, "Temporal Optimization of Data Operations Using Distributed Search and Server Management."

Fett et al., The Web SSO Standard OpenID Connect: In-Depth Formal Security Analysis and Security Guidelines, 2017 IEEE 30th Computer Security Foundations Symposium (Year: 2017).

Filipczyk, Marcin R., Final Office Action dated Oct. 5, 2015 for U.S. Appl. No. 13/950,268.

Filipczyk, Marcin R., Non-Final Office Action dated Mar. 10, 2016 for U.S. Appl. No. 13/950,268.

Filipczyk, Marcin R., Non-Final Office action dated May 22, 2015 for U.S. Appl. No. 13/950,268.

Fiorillo, James N., Non-Final Office Action for U.S. Appl. No. 15/821,543 dated Aug. 16, 2019.

Fiorillo, James N., Non-Final Office Action dated Jun. 7, 2021 for U.S. Appl. No. 16/827,625.

Fiorillo, James N., Notice of Allowance and Fee(s) Due dated Nov. 14, 2019 for U.S. Appl. No. 15/821,543.

Friedman et al., U.S. Appl. No. 61/650,849, filed May 23, 2012 and entitled, "Dynamic Information Streams in a Social Network Platform."

Frunzi, Victoria E., Final Office Action dated May 17, 2021 for U.S. Appl. No. 16/590,218.

Frunzi, Victoria E., Non-Final Office Action dated Dec. 21, 2020 for U.S. Appl. No. 16/590,218.

Frunzi, Victoria E., Non-Final Office Action dated Oct. 16, 2018 for U.S. Appl. No. 15/018,787.

Gaedckle et al., U.S. Appl. No. 61/636,132, filed Apr. 20, 2012 and entitled, "System and Method for Providing a Social Customer Care System."

Georgandellis, Andrew C., Final Office Action dated Mar. 30, 2016 for U.S. Appl. No. 13/900,878.

Georgandellis, Andrew C., Final Office Action dated Oct. 26, 2017 for U.S. Appl. No. 13/900,878.

Georgandellis, Andrew C., Final Office Action dated Sep. 21, 2016 for U.S. Appl. No. 14/035,166.

Georgandellis, Andrew C., Non-Final Office Action dated Jan. 26, 2017 for U.S. Appl. No. 13/900,878.

Georgandellis, Andrew C., Non-Final Office Action dated Jul. 11, 2016 for U.S. Appl. No. 14/035,166.

Goldberg, Ivan R., Final Office Action dated Jun. 29, 2021 for U.S. Appl. No. 16/695,098.

Goldberg, Ivan R., Final Office Action dated Jun. 29, 2021 for U.S. Appl. No. 16/701,143.

Goldberg, Ivan R., Non-Final Office Action dated Apr. 13, 2016 for U.S. Appl. No. 13/865,429.

Goldberg, Ivan R., Non-Final Office Action dated Jun. 18, 2014 for U.S. Appl. No. 13/835,250.

Goldberg, Ivan R., Non-Final Office Action dated Jun. 18, 2014 for U.S. Appl. No. 13/835,502.

Goldberg, Ivan R., Non-Final Office Action dated Jun. 20, 2014 for U.S. Appl. No. 13/865,411.

Goldberg, Ivan R., Non-Final Office Action dated Jun. 23, 2014 for U.S. Appl. No. 13/865,429.

Goldberg, Ivan R., Non-Final Office Action dated Mar. 10, 2021 for U.S. Appl. No. 16/695,098.

Goldberg, Ivan R., Non-Final Office Action dated Mar. 3, 2021 for U.S. Appl. No. 16/701,143.

Hardt, Dick, The OAuth 2.0 Authorization Framework draft-ieft-oauth-v2-31; Internet Engineering Task Force (IEFT) (Year: 2012).

Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.

Hatcher, Deirdre D., Non-Final Office Action dated Jan. 14, 2016 for U.S. Appl. No. 13/950,258.

Holzband et al., U.S. Appl. No. 15/821,543, filed Nov. 22, 2017 and entitled, "Responsive Action Prediction Based on Electronic Messages Among a System of Networked Computing Devices."

Jang, Gijeong, Written Opinion of the International Searching Authority and International Search Report dated Jul. 28, 2015 for International Patent Application No. PCT/US2014/047866.

Jou et al., "Predicting Viewer Perceived Emotions in Animated GIFs", Nov. 3-7, 2014 (4 pages).

Kim, Harry C., Notification of Transmittal of the International Search Report and the Written Opinion of the International Searching Authority, or the Declaration dated Sep. 16, 2020 for International Patent Application No. PCT/US2020/032999.

Kolosowski-Gager, Katherine, Final Office Action dated Feb. 11, 2019 for U.S. Appl. No. 14/627,151.

Kolosowski-Gager, Katherine, Non-Final Office Action dated Jun. 29, 2018 for U.S. Appl. No. 14/627,151.

Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.

Lithium Website, http://www.lithium.com, Dec. 11, 2010, retrieved from Internet Archive, pp. 1-9.

(56) References Cited

OTHER PUBLICATIONS

Liu et al., OAuth Based Authentication and Authorization in Open Telco API; International Conference on Computer Science and Electronics Engineering, 2012 (Year: 2012).
M. Rowe and H. Alani, "What Makes Communities Tick? Community Health Analysis Using Role Compositions," 2012 International Conference on Privacy, Security, Risk and Trust and 2012 International Conference on Social Computing, Amsterdam, Netherlands, 2012, pp. 267-276, doing:10.1109/SocialCom-PASSAT2012. 18.
M2 PressWire, "Alterian: Social media monitoring and analytics comes of age with Alterian's acquisition of market leader Techrigy," Jul. 15, 2009, Anonymous, Norman Media Ltd, London.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Meng, Jau Shya, Non-Final Office Action dated Jan. 3, 2020 for U.S. Appl. No. 15/877,381.
Meng, Jau Shya, Non-Final Office Action dated Jun. 16, 2020 for U.S. Appl. No. 15/877,381.
Mesa, Joel, Final Office Action dated Mar. 30, 2020 for U.S. Appl. No. 15/782,635.
Mesa, Joel, Non-Final Office Action for U.S. Appl. No. 15/782,635 dated Oct. 4, 2019.
Mesa, Joel, Non-Final Office Action dated Oct. 6, 2020 for U.S. Appl. No. 15/782,635.
Mesa, Joel, Notice of Allowance and Fee(s) Due dated Feb. 24, 2021 for U.S. Appl. No. 15/782,635.
Mosley, KyleT., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Nano, Sargon N., Notice of Allowance and Fee(s) Due dated May 19, 2021 for U.S. Appl. No. 17/026,152.
Netzloff, Eric R., Non-Final Office Action dated Nov. 25, 2014 for U.S. Appl. No. 13/848,706.
Netzloff, Eric R., Non-Final Office Action dated Nov. 6, 2018 for U.S. Appl. No. 14/824,021.
Neuman, Clifford B., Proxy-Based Authorization and Accounting for Distributed Systems, IEEE 1993 (Year: 1993).
Niruntasukrat et al., Authorization Mechanism for MQTT-based Internet of Things, IEEE Icc 2016 Workshops W07—Workshop on Convergent Internet of Things (Year: 2016).
Ofori-Awuah, Maame, Final Office Action dated Oct. 2, 2020 for U.S. Appl. No. 14/929,209.
Ofori-Awuah, Maame, Final Office Action dated Sept. 6, 2019 for U.S. Appl. No. 14/929,209.
Ofori-Awuah, Maame, Non-Final Office Action dated Apr. 5, 2019 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Rashid, Ishrat, Non-Final Office Action dated Apr. 2, 2021 for U.S. Appl. No. 15/782,653.
Rashid, Ishrat, Non-Final Office Action dated Jun. 11, 2019 for U.S. Appl. No. 15/782,653.
Rashid, Ishrat, Non-Final Office Action dated Jun. 12, 2020 for U.S. Appl. No. 15/782,653.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools To Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multifactorauthentication Using Credential and Authentication Management in Scalable Data Networks."
Senftleber et al., U.S. Appl. No. 16/194,126, filed Nov. 16, 2018 and entitled, "Multiplexed Data Exchange Portal Interface in Scalable Data Networks."
Shaw, Robert A., Final Office Action dated Mar. 16, 2021 for U.S. Appl. No. 16/158,169.
Shaw, Robert A., Non-Final Office Action dated Jan. 22, 2021 for U.S. Appl. No. 16/158,169.
Singh, Amardeep, IP Australia, Examination Report No. 1 for Australia Patent Application No. 2019209542 dated Dec. 17, 2020.
Spasojevic et al., U.S. Appl. No. 61/943,047, filed Feb. 21, 2014 and entitled, "Domain Generic Large Scale Topic Expertise & Interest Mining Across Multiple Online Social Networks."
Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm?d=2788584.
Suh, Andrew, Final Office Action dated Dec. 3, 2020 for U.S. Appl. No. 16/158,172.
Suh, Andrew, Non-Final Office Action dated Jul. 8, 2020 for U.S. Appl. No. 16/158,172.
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.
Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.
Thomas, Shane, Written Opinion of the International Searching Authority and International Search Report dated Aug. 16, 2013 for International Patent Application No. PCT/US2013/037107.
Trapanese, William C., Non-Final Office Action dated May 27, 2020 for U.S. Appl. No. 16/413,577.
U.S. Appl. No. 11/333,826, filed Jan. 17, 2006 and entitled, "Knowledge Filter".
U.S. Appl. No. 11/692,169, filed Mar. 27, 2007 and entitled, "Knowledge Filter".
U.S. Appl. No. 60/158,496, filed Oct. 8, 1999 and entitled, "Knowledge Filter".
U.S. Appl. No. 60/816,100, filed Jun. 22, 2006 and entitled, "Knowledge Filter".
U.S. Appl. No. 60/816,900, filed Jun. 26, 2006 and entitled, "Knowledge Filter".
Vo, Huyen X., Non-Final Office Action dated Mar. 15, 2019 for U.S. Appl. No. 15/782,642.
Vo, Huyen X., Non-Final Office Action dated Oct. 15, 2020 for U.S. Appl. No. 16/458,183.
Walsh, John B., Non-Final Office Action dated Mar. 24, 2017 for U.S. Appl. No. 14/702,696.
Wang, Xiaoqing, and Shannon Lantzy. "A Systematic Examination of Member Turnover and Online Community Health." Thirty Second International Conference on Information Systems, Shanghai (2011), pp. 1-11.

(56) References Cited

OTHER PUBLICATIONS

Wollenstein et al., U.S. Appl. No. 61/639,509, filed Apr. 27, 2012 and entitled, "Systems and Methods for Implementing Custom Privacy Settings."

Wu, Michael, U.S. Appl. No. 61/734,927, filed Dec. 7, 2012 and entitled, "Systems and Methods for Presenting Analytic Data."

Wu, Michael, U.S. Appl. No. 62/072,929, filed Oct. 30, 2014 and entitled, "Systems and Methods To Monitor Health of Online Social Communities."

Young, Lee W., Notification of Transmittal of the International Search Report and the Written Opinion of the International Searching Authority, or the Declaration, dated Apr. 1, 2019 for International Application No. PCT/US2018/05545.

Young, Lee W., Written Opinion of the International Searching Authority and International Search Report dated May 28, 2014 for International Patent Application No. PCT/US2013/073625.

Young, Lee W.; Notification of Transmittal of the International Search Report and the Written Opinion of the International Searching Authority, or the Declaration dated Jun. 24, 2019 for International Application No. PCT/US2019/014637.

Olshannikov, Alex, Non-Final Office Action dated Oct. 22, 2015 for U.S. Appl. No. 14/098,509.

Perungavoor, Venkatanaray, Notice of Allowance and Fee(s) Due for U.S. Appl. No. 16/158,167, dated May 15, 2020.

Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.

Rao et al., U.S. Appl. No. 62/049,642, filed Sep. 12, 2014 and entitled, "System and Apparatus for an Application Agnostic User Search Engine."

Rashid, Ishrat, Final Office Action for U.S. Appl. No. 15/782,653 dated Sep. 19, 2019.

Rashid, Ishrat, Final Office Action dated Jun. 15, 2021 for U.S. Appl. No. 15/782,653.

Georgandellis, Andrew C., Non-Final Office Action dated May 23, 2017 for U.S. Appl. No. 14/035,166.

Georgandellis, Andrew C., Non-Final Office Action dated Nov. 3, 2015 for U.S. Appl. No. 13/900,878.

Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.

Goldberg, Ivan R., Final Office Action dated Jan. 12, 2015 for U.S. Appl. No. 13/835,502.

Goldberg, Ivan R., Final Office Action dated Jan. 13, 2015 for U.S. Appl. No. 13/835,250.

Goldberg, Ivan R., Final Office Action dated Jan. 15, 2015 for U.S. Appl. No. 13/865,429.

European Patent Office, Extended European Search Report dated Nov. 12, 2021 for European Patent Application No. 19741372.7.

Fiorillo, James N., Final Office Action dated Sep. 27, 2021 for U.S. Appl. No. 16/827,625.

Fiorillo, James N., Notice of Allowance and Fee(s) Due dated Nov. 24, 2021 for U.S. Appl. No. 16/827,625.

Leimeister et al., "Success factors of virtual communities from the perspective of members and operators: An empirical study," Proceedings of the 37th Hawaii International Conference on Systems Sciences 2004, IEEE, pp. 1-10 (Year: 2004).

Ofori-Awuah, Maame, Non-Final Office Action dated Sep. 28, 2021 for U.S. Appl. No. 14/929,209.

Rashid, Ishrat, Non-Final Office Action dated Dec. 22, 2021 for U.S. Appl. No. 15/782,653.

Shaw, Robert A., Non-Final Office Action dated Dec. 27, 2021 for U.S. Appl. No. 16/158,169.

\* cited by examiner

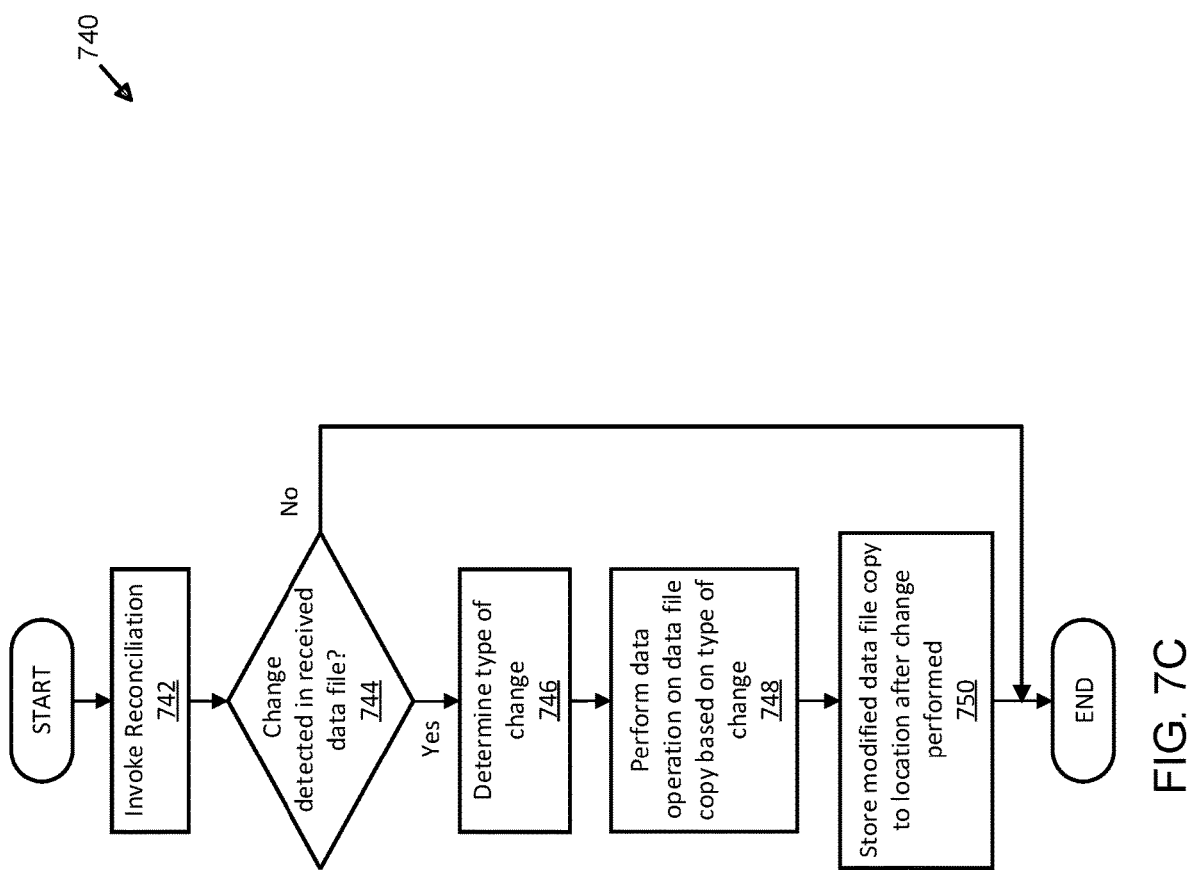

TEMPORAL OPTIMIZATION OF DATA OPERATIONS USING DISTRIBUTED SEARCH AND SERVER MANAGEMENT

CROSS-REFERENCE TO RELATED APPLICATIONS

This nonprovisional patent application is a continuation application of copending U.S. patent application Ser. No. 15/877,381, filed Jan. 22, 2018 and entitled, "TEMPORAL OPTIMIZATION OF DATA OPERATIONS USING DISTRIBUTED SEARCH AND SERVER MANAGEMENT;" all of which is herein incorporated by reference in its entirety for all purposes.

FIELD

The present invention relates generally to computer and data science, computer software and hardware, computer and server memory, distributed server configuration, and data storage and retrieval management. More specifically, techniques for temporal optimization of data operations using distributed search and server management are described.

BACKGROUND

As various computer programs, applications, platforms, and other users and consumers of data increase, there are also a rising number of problems associated with managing large amounts of data. Processing, storage, and retrieval of large quantities of data, including that generated from social media and social networks, are areas of innovation that are struggling to keep pace with the rising demand for increasingly complex and sophisticated data storage. Searching and retrieving data stored in large amounts across distributed data networks that use extensive physical, virtual, and logical resources is becoming increasingly difficult to deploy and manage and incurs significant expense to users, consumers, and customers of data. In other words, conventional techniques for managing large amounts of data address the inherent issue of scalability by providing expensive solutions that typically involve adding more resources instead of managing existing resources for greater efficiency, lower latency, and higher reliability; these techniques are technologically limited and expensive in terms of time, labor, and financial cost. With data sources such as online commerce, social media, social networks, enterprises (i.e., large corporate, governmental, academic, institutional, military, financial, medical/healthcare, or other types of private data networks) generating increasingly large quantities of data, conventional techniques for processing, storing, and managing are failing to provide solutions that are able to support these data needs. Further, finding specific items within these large quantities of data is also increasingly difficult. Still further, there are individuals, entities, and organizations that wish to commercialize data, but due to the large quantities, are finding it increasingly difficult to communicate, market, sell, promote, or otherwise generate targeted messages to intended users. Conventional data management techniques store large amounts of data in a manner that do not facilitate rapid and accurate searching and retrieval. Conventional techniques typically rely upon increasing the amount and types of data storage servers (i.e., adding physical, virtual, or logical processing or storage resources) and, when combined with conventional partitioning techniques such as striping, are problematic because these techniques do not scale. Often conventional techniques are not only slow and inefficient when searching and retrieving data from databases, but these also typically result in generating server indices that are also massive in scale and difficult to search for specific data. More importantly, these conventional techniques are prohibitively expensive as data storage servers tend to be expensive, complex, and difficult to deploy, particularly for smaller enterprises and businesses with substantially lesser technology budgets and financing options. For hosted services such as computing cloud-based storage services, some of the complexities of deployment and management are lessened, but the expense of using these services continues to remain high as different classes of servers with different levels of performance also carry different prices. Faster performance typically requires higher cost, which is problematic as computer and data science continues to improve.

Thus, what is needed is a solution for managing, storing, and retrieving data without the limitations of conventional techniques.

BRIEF DESCRIPTION OF THE DRAWINGS

Various embodiments or examples ("examples") of the invention are disclosed in the following detailed description and the accompanying drawings:

FIG. 7C illustrates an exemplary process for reconciliation operations for temporal optimization of data operations using distributed server and shard management;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
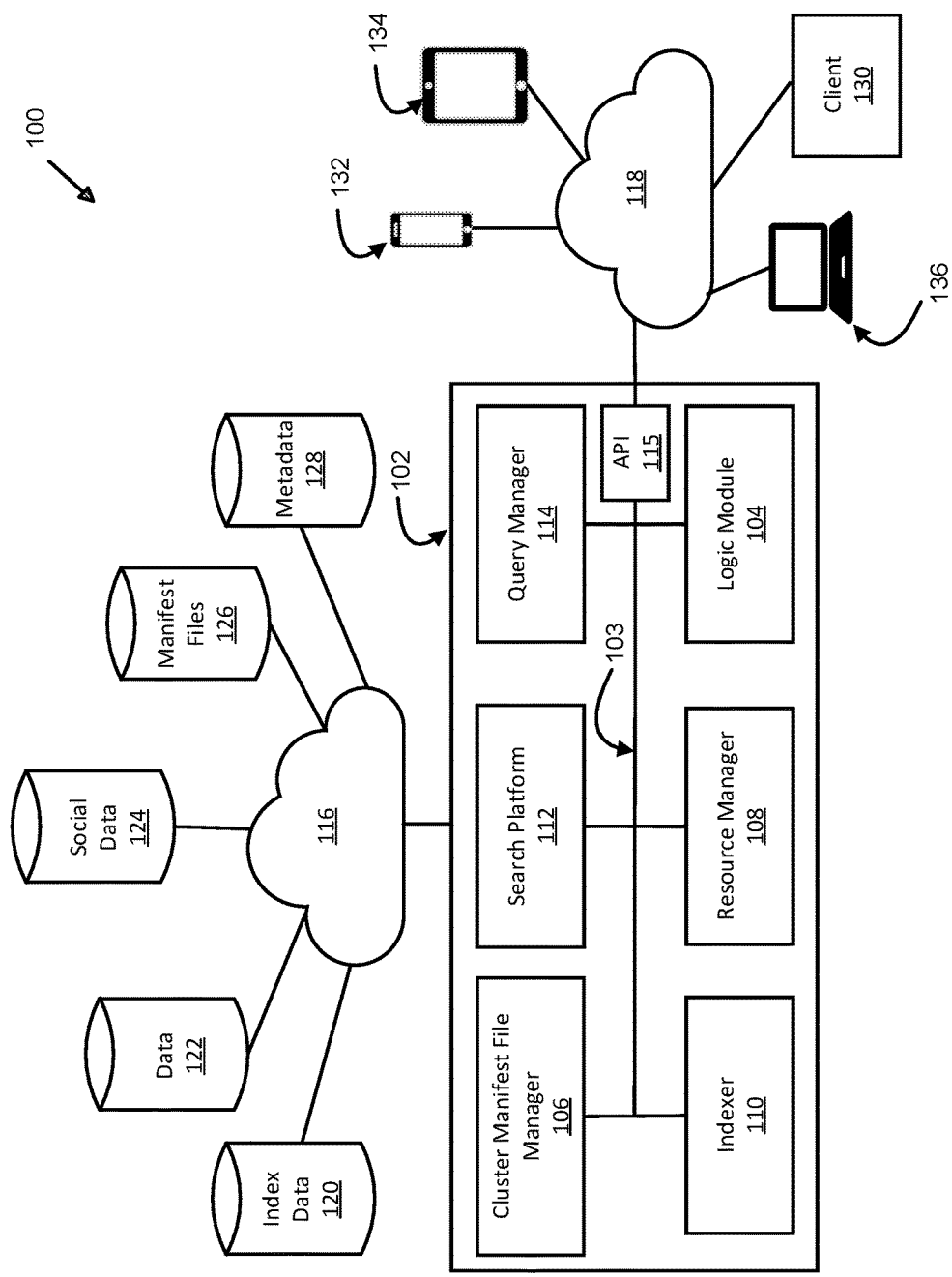
FIG. 1 illustrates an exemplary computing environment for temporal optimization of data operations using distributed server and shard management.

FIG. 1 illustrates an exemplary computing system for temporal optimization of data operations using distributed server and shard management. Here, system 100 includes application 102, logic module 104, cluster manifest file manager 106, resource manager 108, indexer 110, search platform 112, query manager 114, application programming interface (hereafter "API") 115, data networks 116-118, index database 120, database 122, social database 124, manifest files database 126, metadata database 128, client 130, mobile clients 132-134, and computer 136. In some examples, "system" may refer to or include the description of a computer network system or topology associated with a map, network, layout, environment, or the like of computing resources that are used to implement a feature, function, process, element, component, part, or multiple instances thereof, without any particular limitation as to the type, configuration, programming or formatting language, service, class, resource, specification, protocol, or other attributes thereof. As used herein, "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Also as used below, "platform" may refer to any type of computer hardware (hereafter "hardware") and/or software environment using one or more local, remote, distributed, networked, or computing cloud (hereafter "cloud")-based computing resources (e.g., computers, clients, servers, tablets, notebooks, smart phones, cell phones, mobile computing platforms or tablets, and the like) to execute an application, such as those described above, without restriction or limitation to any particular implementation, design, configuration, instance, or state. Distributed resources such as cloud networks (also referred to interchangeably as "computing clouds," "storage clouds," "cloud networks," or, simply, "clouds," without restriction or limitation to any particular implementation, design, configuration, instance, or state) may be used for processing and/or storage computing resources, without restriction or limitation to any particular implementation, design, configuration, instance, or state of a device or machine, physical, virtual, logical, or otherwise.

Referring back to FIG. 1, in some examples, data may be processed from various sources, including, but not limited to index database 120, database 122, social database 124, manifest files database 126, and metadata database 128. Data may be retrieved from local, remote, distributed, networked, or cloud-based databases or data sources such as data streams or sources of data that are generated from various types of applications or clients. As used herein, data may be stored in various types of data structures including, but not limited to databases, data repositories, data warehouses, data stores, or other data structures configured to store data in various computer programming languages and formats in accordance with various types of data schemas such as SQL, MySQL, NoSQL, DynamoDB™ from Amazon® Web Services, Inc. of Seattle, Wash., FMP, Oracle®, relational or unstructured, or others, without limitation or restriction to any particular instance or implementation. Further, references to databases, data structures, or any type of data storage facility may include any embodiment as a local, remote, distributed, networked, cloud-based, or combined implementation thereof. For example, social networking applications being used on different types of devices (e.g., client 130, mobile clients 132-134, and computer 136) may be generating data in different forms, formats, and data storage schema on different types of data storage devices and databases that are configured to store data generated for text messaging, image, audio or video streams, blog (i.e., World Wide Web-posted log) or vlog (i.e., video log) entries, instant messages, disappearing messages (e.g. snaps using Snapchat™ simple message system (i.e., SMS, IRC, and the like) messages, and the like, without limitation or restriction. Data may be generated from "tweets" or messages from applications such as Twitter® of San Francisco, Calif., "snaps" using the Snapchat® application such as those developed by Snap® of Venice, Calif., or "messenger" posts using applications such as Facebook® of Menlo Park, Calif. In some examples, data may be formatted using simple messaging data communication and transmission protocols such as Internet Relay Chat (IRC), SMS, instant messaging (IM), or others, without limitation. In other examples, client 130, mobile clients 132-134, and computer 136 may generate data in other forms and formats using programming and formatting languages intended to transmit, transfer, or transport data at different levels of an application architecture (as described in greater detail below). For example, Java®, JavaScript®, Python™, XML, and other data formats and programs may be used in conjunction with the techniques described herein by application 102, which may be implemented to provide messaging functionality at the application layer of a seven-layer "stack" application architecture following a standard such as the Open Systems Interconnect (OSI) model.

As shown in FIG. 1, in some examples, application 102 may be an application configured to receive data from various sources (e.g., index database 120, database 122, social database 124, manifest files database 126, metadata database 128, client 130, mobile clients 132-134, computer 136, or others), which may include stored data (e.g., index database 120, database 122, social database 124, manifest files database 126, metadata database 128, or others) or data generated in real-time or substantially real-time from other applications, clients, or systems. In some examples, data may be sent or received over data networks 116-118, which may be local area networks (LAN), wide area networks (WAN), municipal area networks (MAN), wireless local area networks (WLAN), cloud computing or cloud data networks that use disparate computing and storage resources managed by other applications or resources to provide storage and processing capabilities. As described herein, data may be sent using any type of data network that is configured to send and receive data in any type of digital format, regardless of program or formatting language, without limitation.

As shown here, data may be queried from, retrieved, or stored to one or more of index database 120, database 122, social database 124, manifest files database 126, metadata database 128, or other types, schema, or structures, all, some, or none of which may be configured to store data in data structures such as a database, data store, data repository, data facility, data warehouse, or the like. Data may also be generated and received from or sent to one or more of client 130, mobile clients 132-134, computer 136, or other clients (not shown) that consume, use, or generate data.

As shown, client 130, mobile clients 132-134, and computer 136 are representative of types of clients and devices that may send data to or receive data from application 102 over data network 118. Data may be in any type of output format generated by an application (e.g., Twitter®, Snapchat®, Messenger®, instant messaging, email, text messaging, IRC, HTML, XML, Java®, or others, without limitation), transmitted over data networks 118 to application 102. Likewise, data may be stored in any type of format and, in some examples, classified as various types of data formats in one or more of index database 120, database 122, social database 124, manifest files database 126, metadata database 128, or other databases (not shown). For example, messaging data may be transmitted from a mobile tablet (e.g., mobile clients 132-134) over data network 118 to application 102. Application 102 may be configured to receive or send data directly or indirectly to/from any of modules 104-115 over data networks 116-118. In some examples, data received by or sent from application 102 may be transmitted over application programming interface 115, which may be configured to receive, convert, and transfer (i.e., send) data in any type of data format from clients 130-136 for processing by application 102 (or any of modules 104-114) before being stored to one or more of index database 120, database 122, social database 124, manifest files database 126, metadata database 128, or other databases (not shown). Similarly, data may be queried and retrieved from one or more of index database 120, database 122, social database 124, manifest files database 126, metadata database 128, or other databases (not shown) using, for example, API 115. Further, data may also be processed by one or more of modules 104-114 and transferred using API 115 over data network 116 (which may also be implemented using a single or multiple data networks) to one or more of index database 120, database 122, social database 124, manifest files database 126, metadata database 128, or other databases (not shown) to be stored at a location that may be indicated in a server or database index (hereafter "index"). Application 102 may also be configured to transfer data to/from one or more of clients 130-136 over API 115 to one or more of logic module 104, cluster manifest file manager 106, resource manager 108, indexer 110, search platform 112, or query manager 114 to perform processing or other functions on the data before transmitting data back to clients 130-136 or storing processed data (i.e., "processed data" refers to resultant data generated by one or more of logic module 104, cluster manifest file manager 106, resource manager 108, indexer 110, search platform 112, query manager 114, or application 102) on one or more of index database 120, database 122, social database 124, manifest files database 126, metadata database 128. For example, a stream of "social data" (e.g., data generated by a social media application or network such as those described above or others, without limitation) may be received as input to application 102 over data network 118. Social data, in some examples, may refer to data generated from any type of application, system, device, platform, program, or other set of computer instructions that are intended for use in enabling data transfer and communication between endpoints used by and for social purposes such as the creation, management, or participation in a computing or online community. As used herein, "online" may refer to any type of computing environment in which endpoints (e.g., clients 130-136) are configured to transfer data between each other, either directly or indirectly over one or more data networks (e.g., data networks 116-118). As an example, social data may be generated from social media (e.g., content that is transmitted digitally to/from various types of devices such as posting digital still images, video and audio files, text-based content such as editorials, news feeds, entertainment-related information, and others, without limitation or restriction), social networks (e.g., data networks that are purposes-configured and deployed to transfer social data), or applications that can be used for purposes such as social media, among others. Further, social data is an example of data that application 102 may be executed upon, but is neither a limitation nor a restriction on the types of data that may be processed by application 102.

Referring back to FIG. 1, social data may be stored in social database 124 and transmitted from or sent to one or more of clients 130-136 using application 102. In other examples, data (including social data and other types of data) may be transferred between clients 130-136 and data storage facilities (e.g., index database 120, database 122, social database 124, manifest files database 126, metadata database 128, or others as described herein) directly (not shown) or indirectly through, for example, application 102 using data networks 116-118 or other data networks (not shown). Regardless, data received by application 102 may be processed by one or more of logic module 104, cluster manifest file manager 106, resource manager 108, indexer 110, search platform 112, and/or query manager 114 in order to temporally optimize the storage and retrieval of data generated from, for example, clients 130-136. "Temporal optimization" techniques are described in greater detail below.

Here, application 102 is configured with logic module 104, cluster manifest file manager 106, resource manager 108, indexer 110, search platform 112, and query manager 114. In some examples, application 102 may be configured differently than is shown with more, fewer, or different modules apart from those shown and described (i.e., logic module 104, cluster manifest file manager 106, resource manager 108, indexer 110, search platform 112, and query manager 114). As shown, logic module 104, cluster manifest file manager 106, resource manager 108, indexer 110, search platform 112, and query manager 114 may be implemented as software, hardware, firmware, or a combination thereof, without limitation or restriction to any computer programming or formatting language, device, type, or configuration. However, here, one or more of logic module 104, cluster manifest file manager 106, resource manager 108, indexer 110, search platform 112, and query manager 114 may be implemented as software modules that are configured to communicate with each other module over a local or distributed data network. In some examples, application 102 and logic module 104, cluster manifest file manager 106, resource manager 108, indexer 110, search platform 112, and query manager 114 may be implemented as part of a software platform where each module may be encoded using, for example, Java®, Python™, JavaScript (also referred to as JS), binary encoding, machine assembly, COBOL, HTML, xHTML, XML, or any other type of computer programming and formatting languages.

Here, logic module 104 is configured to provide processes and algorithms for various features and functionality, including providing control functionality for cluster manifest file manager 106, resource manager 108, indexer 110, search platform 112, and query manager 114. In some examples, logic module 104 may be a set of rules that are manually input to provide parameters, thresholds, and other quantitative restrictions or comparative statements to help determine actions to be taken, which of cluster manifest file manager 106, resource manager 108, indexer 110, search platform 112, or query manager 114 to invoke, service calls to make (e.g., over API 115), or any other functions that require decisions or a determinant action to be taken. In other examples, logic module 104 may be implemented not as a rules-based engine or module, but instead as a heuristic, semantic, or context evaluation set of algorithms that evaluate incoming data from, for example, clients 130-136 or elsewhere (e.g., index database 120, database 122, social database 124, manifest files database 126, metadata database 128, or other data storage or processing resources over data networks such as data networks 116-118) in order to parse, evaluate, analyze, or perform other functions provided by application 102. As shown, application 102 is configured with several modules that provide different platform functions for temporally managing data from various sources in order to optimize or improve the efficiency of searching and retrieval in response to queries as well as reducing latency in returning data in response to a query, accurately and efficiently. For example, if social data (not shown) is generated from an input or "stream" of social data coming from one or more of clients 130-136, it may be received at API 115 and further processed by resource manager 108, which may be configured to manage various types of storage resources (e.g., local, distributed, networked, cloud-based, and the like) to determine the technical configuration and location of the social data to be stored (e.g., in social database 124). Resource manager 108, in some examples, may also exchange data with one or more other modules (e.g., cluster manifest file manager 106, indexer 110, search platform 112, query manager 114, or API 115) to perform other functions. As shown, resource manager 108, in some examples, can be used cooperatively with cluster manifest file manager 106 and indexer 110 in order to determine a location that has been temporally-optimized (as described in further detail below) for subsequent search and retrieval in response to query requests (hereafter "query" or "request," which may be used substantially synonymously or interchangeably with each other to indicate a request for data in response to a request formatted in accordance with a query language (without limitation or restriction to any particular language) from a given location and resource (e.g., server or group of logically or physically coupled (directly, indirectly, or remotely) servers).

As shown, cluster manifest file manager 106 may be configured to receive instructions from logic module 104 and/or resource manager 108 to configure one or more databases intended to store processed data generated from data received by application 102 from, for example, clients 130-136. Databases may include index database 120, database 122, social database 124, manifest files database 126, metadata database 128, and others, without limitation or restriction to those shown and described. In some examples, storage and/or processing resources such as index database 120, database 122, social database 124, manifest files database 126, metadata database 128, and others may be configured by cluster manifest file manager 106 to create a managed system of resources that can store data processed by application 102 by optimizing the storage and retrieval of data (i.e., increasing the speed of execution of program instructions to execute a query, delete, add, or write operation in one or more of index database 120, database 122, social database 124, manifest files database 126, metadata database 128, or other database(s), without limitation). As described in further detail below, cluster manifest file manager 106 is configured to provide program instructions from application 102 to each of index database 120, database 122, social database 124, manifest files database 126, metadata database 128, or other databases (not shown) in order to configure and partition by establishing shards and slicing each storage server in order to ensure that queries, when received by application 102, are executed and sent responses by minimalizing search time. Distributed search platforms or applications such as Solr™ the Apache Lucene™ Foundation, or others may be used, in some examples, to implement search platform 112 to provide data searching functionality. In other examples, different search platforms or applications may be used and are not limited to the examples shown and described. Here, search platform 112 may be configured to receive a query from API 115 and, using the techniques described herein, "rewrite" (i.e., structure and configure a query request received by application 102 for a given data schema, without limitation or restriction to any particular data storage facility or schema shown or described) a query and execute it against a given data structure (i.e., database and data schema such as those implemented by one or more of index database 120, database 122, social database 124, manifest files database 126, metadata database 128, and others).

Referring back to cluster manifest file manager 106, in some examples, one or more of index database 120, database 122, social database 124, manifest files database 126, and metadata database 128 may be configured in one or more host groups. In some examples, host group configuration may be performed using a manifest file (not shown), which includes various server parameters, ports, services, rules, thresholds, limitations, restrictions, data transmission protocols, policies, addresses, partitioning (i.e., identifying, allocating, and/or configuring, among other functions shards, stripes, and partitions of servers), or any other setting that may be used to determine how to allocate storage resources for storing data received from and retrieved by application 102. Further, as described herein, a manifest file may be used to configure one or more host groups in order to partition storage resources to temporally optimize data processing and storage functions.

In some examples, a manifest file may be used to configure a given host group to store data that is aged within a give time range. A time characteristic such as a time range may be measured in seconds, minutes, hours, days, weeks, months, or any other measurement of time that may be useful for server configuration. As an example, a host group may be configured using a manifest file to identify a given resource to store data and/or processed data generated between t=0 (i.e., time of initial generation (i.e., the time of posting, transmission, sent, or the like)) and t=86400 seconds, which may be a time range for saving data occurring in the first twenty-four (24) hours following data generation. As used herein, a "time characteristic" may refer to a time range, a time bucket, a bucket of time, a time bracket, or any expression that is used to encompass a discrete period of time, regardless of the actual unit of time measurement. Continuing the example described above, for data that "ages" or is "aged" past the first twenty-hour (24) hours, a different host group may be allocated for movement and storage of the data. In other words, as data to be stored in one or more of index database 120, database 122, social database 124, manifest files database 126, and metadata database 128 ages, the data may be moved from one host group to another; from a device or resource of a given server class to another device or resource of a different server class. This "bucketing" or sharding of data permits faster query responses for rewritten queries generated by query manager 114 because indexer 110 can return a location to be searched by search platform 112 for the requested (i.e., target) data to be returned. Further detail regarding temporal optimization of server resources for processing, storing, and retrieving data (e.g., social data, among others, without limitation or restriction) is described in greater detail below.

As described herein, any of index database 120, database 122, social database 124, manifest files database 126, and metadata database 128 may be configured using one or more manifest files to configure for temporal optimization of data processing, storage, and retrieval. In other words, database 122 may include multiple storage servers configured to store data for different time ranges and, as stored data (e.g., data and processed data that has been directed for storage by application 102) ages, it may be moved between different partitions (e.g., shards, slices, stripes, and the like), host groups, and server classes in order to provide storage and retrieval functionality that is optimized to retrieve recently-generated data at higher data retrieval speeds using servers with data retrieval speeds and technologies that are faster and more expensive. However, by storing data based on aging, data storage can be optimized by targeting data within given time ranges onto different host groups and different server classes, each of which may have different costs associated with the use of servers assigned to these classes. In so doing, data storage is optimized to not only optimize storage and processor resource costs, but also minimize latency and increase accuracy of data retrieval.

In some examples, server configuration using a manifest file may be further performed by determining, for a given host group, a server type and class to be used to implement the host group. In the example above, data generated more recently (i.e., not aging significantly since initial generation from clients 130-136) may be of greater interest to a user or community of users. As social media applications and networks can generate large quantities of data and numerous discrete data files (e.g., posts, "tweets," messages, and the like) resulting in millions of users generating query requests for a given text, still image, audio, or video file nearly simultaneously, the techniques described herein for host group configuration (i.e., using a manifest file) can partition processing and storage resources based on time characteristics and assign different server classes having different access speeds that are allocated amongst data that is more likely to be requested in large numbers of query requests as opposed to aged data that may be stored on other servers or storage resources that have slower (i.e., and less expensive) server classes assigned. Using the described techniques, system 100 is capable of responding to large numbers of queries due to increased read-write-access capabilities (e.g., solid state memory technologies providing faster addressing speeds than mechanically-addressed memory technologies, quantum computing processors relative to conventional semiconductor, silicon-based memory technologies, and others) and provide increased performance by assigned to faster processing, storage, and retrieval resources more recent data (e.g., data from clients 130-136 within the first twenty-four (24) hours since initial generation)). Further, by periodically reconciling processing and storage resources, data may be moved between different server classes as aging increases, or other parameters or characteristics, in addition to time characteristics, change. In some examples, a periodicity for performing reconciliation may also be indicated in a manifest file. Thus, continuing the above example, when a query is received for recent data, query manager 114 may be configured to parse, evaluate, and re-write a given request into a rewritten query that is run against those servers identified by indexer 110 as being assigned to data stored in the first twenty-four (24) hours. As data is stored, in one or more of index database 120, database 122, social database 124, manifest files database 126, and metadata database 128, indexer 110 may be configured to modify a server index (hereafter "index") to specify a location, including host group, server, shard, slice, partition, server class, or other parameter to be used by search platform 112 in executing a query. As shown, indices for given servers may be stored in index database 120, among others. Data (e.g., actual data or copies thereof as generated by clients 130-136) may be stored in one or more databases such as database 120 or others. Different types of data may also be segmented, isolated, or otherwise separated and stored in different host groups using the techniques described herein. For example, data generated from social media applications and networks may be stored as "social data" in social database 124. Further examples of using different data storage resources may also include storing manifest files in manifest files database 126 and metadata in metadata database 128, among others. As described herein, metadata may refer to descriptive data that is generated during the parsing and evaluation of data from clients 130-136 by application 102 or any modules or elements (e.g., logic module 104, cluster manifest file manager 106, resource manager 108, indexer 110, search platform 112, and query manager 114, among others that may not be shown or described in FIG. 1). Metadata may be generated when application 102 parses data generated by clients 130-136 such as HTML or XML tags that may be used in a database to associate a given data file with another data file. For example, data received from clients 130-136 by application 102 may be parsed and evaluated prior to be stored on database 122. A copy of the received data file(s) may be generated and the original data may be stored as a "master" version of the data file(s) while a copy is stored in another database (not shown) apart from database 122. When storage resources (e.g., index database 120, database 122, social database 124, manifest files database 126, and metadata database 128, among others) are updated due to changes in data file(s) indicated by more recent incoming data received by application 102, metadata stored in metadata database 128 may be used to identify any copies of data file(s) intended for updating (e.g., due to data operations such as deleting, adding, or writing data to a given data file previously stored in a different state). In some examples, metadata may also be used to identify aging associated with a given data file in order to determine a host group and server class to which the data is moved in order to maintain temporal optimization.

In some examples, a process (e.g., an algorithm or set of algorithms that may or may not be logically related to update a given state of stored data and storage resources) known as reconciliation (as described in greater detail below) may be performed by system 100 and application 102, index(es) are updated by indexer 110 to reflect modified locations and any parameters such as those specified above. Various types of data operations may be performed in order to "reconcile" a previously stored version of a data file with a more recently received data file by application 102. In some examples, a master version of a data file (not shown) and a copy of a data file stored (not shown), for example, in database 122, may be stored on a server shard located on a device of a server class that has the highest data retrieval rate in system 100. A newly received data file may be evaluated by application 102 to determine that one or more data operations (e.g., add, delete, read, write, transfer, or others) is to be performed based on, for example, time characteristics that indicate the data file is to be transferred to another host group in which a different server class is used for data storage and retrieval. As described in greater detail below, reconciliation may be used to manage how data files are stored on one or more of index database 120, database 122, social database 124, manifest files database 126, and metadata database 128, among others. In other examples, system 100 and the above-described elements may be implemented differently, with variations in function, order, procedure, and process, without limitation to any of the examples or accompanying descriptions.

Figure 2:
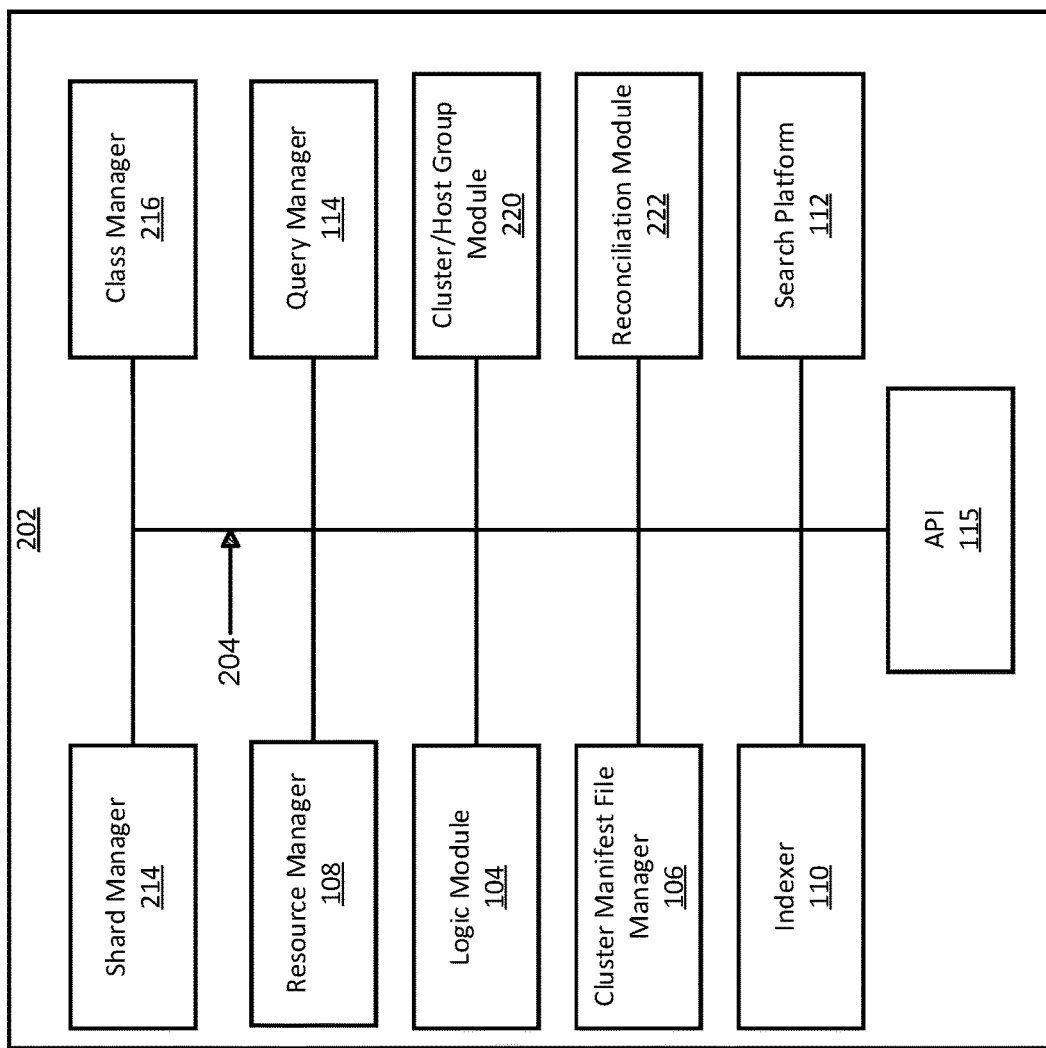
FIG. 2 illustrates an exemplary application architecture for temporal optimization of data operations using distributed server and shard management.

FIG. 2 illustrates an exemplary application architecture for temporal optimization of data operations using distributed server and shard management. Here, an alternative view of application 102 is shown with application 202, including logic module 104 (FIG. 1), cluster manifest file manager 106 (FIG. 1), resource manager 108 (FIG. 1), indexer 110 (FIG. 1), search platform 112 (FIG. 1), query manager 114 (FIG. 1), API 115 (FIG. 1), shard manager 214, class manager 216, cluster/host group module 220, and reconciliation module 222. As shown, logic module 104, cluster manifest file manager 106, resource manager 108, indexer 110, search platform 112, query manager 114, and API 115 may be implemented substantially similarly to the like-numbered elements shown above and described in connection with FIG. 1. Referring back to FIG. 2, application 202 may be implemented as an alternative configuration of application 102 (FIG. 1) with additional elements (i.e., shard manager 214, class manager 216, cluster/host group module 220, and reconciliation module 222) that may be implemented and configured to provide additional functionality. Structurally, in some examples, application 202, like application 102, and the elements shown and described may be implemented as hardware, software, firmware, logic-specific circuitry, or as a combination thereof, without restriction or limitation to any particular implementation environment, state, or configuration.

In some examples, application 202 using API 115 may be in data communication with one or more data processing and/or storage resources (not shown) over one or more data networks (not shown). Using a manifest file retrieved from manifest files database 126 (not shown), one or more host groups can be configured by application 202 using the techniques described herein. For example, shard manager 214 can be configured to determine how, across a number of storage resources (as identified by resource manager 108 (FIG. 1)), shards can be partitioned and identified to store various segments of data and data files (as used herein, "data" and "data files" may be used interchangeably without limitation and are not subject to any particular implementation or configuration) based on a time associated with the generation, transmission, receipt, or other time characteristic associated with the data. When received and parsed, data files can be determined by application 202 to identify metadata (e.g., metadata stored in metadata database 128) to indicate time characteristics such as those described herein. Time characteristics can, in some examples, be used to determine shards in which to store data and processed data, including determining individual partitions (e.g., shards, slices) and partitioning techniques such as striping. Here, shard manager 214 may be configured to determine how shards are partitioned across host groups managed by application 202 as well as identifying to cluster/host group module 220, which shards are assigned to a given host group or, in some examples, whether given shards span multiple servers that are being used in different host groups, as described in greater detail below.

As shown, class manager 216 may be configured as a software, hardware, firmware, circuitry, or combination thereof and used as an individual component or element of application 202 to assign or determine the assignment of particular classes of servers to host groups being managed by application 202. For example, if two host groups are each assigned a server class, server class 1 may be assigned to a host group as solid state memory for fast data access, retrieval, and data operations for data to be stored that was originally generated in the last 12 hours. Continuing the above example, data that has aged past 12 hours (e.g., 12 hours and 1 second or longer) may be moved to a different host group using older, mechanically-addressed memory technology (e.g., disk drives, and the like). The location of data stored on either of the above-referenced host groups may be identified to query manager 114 (FIG. 1), which can track and associate queries intended for data within the first 12 hour time range or the "12 hour and older" time range and, in so doing, target more precisely and quickly, rewritten queries so as to not consume storage and/or processing resources searching host group(s) outside of the time range of requested data (i.e., as indicated in a query).

As described herein, class manager 216 may be configured to associate, assign, track, or identify which classes of servers are assigned to various host groups. Data transferred between class manager 216 and cluster/host group module 220 may be used by application 202 to implement a management system of various host groups and clusters of servers in order to deploy the techniques described herein. As used herein, clusters of servers may be used interchangeably with "server cluster" or "cluster" and is intended to refer to a computing cluster or node of servers that are logically assigned together as a group, which may include multiple instances of physical or virtual machines or servers, partitions, shards, slices, or the like. Further, cluster/host group module 220 may also exchange data with reconciliation module 222 in order to reconcile (i.e., perform reconciliation) data stored throughout various host groups and/or server clusters if, in some examples, new incoming data (e.g., input data streams for various social media, social networks, or social media-oriented applications, and the like) indicate that data previously stored has changed. As an example, when a change is detected (e.g., an older posted video or image is replaced with a newer version, an news article or feed is replaced with a recent news update, an audio file previously stored (e.g., database 122) has been edited to be replaced by a newer version of the audio file, and the like), cluster/host group module 220 may send data as a command in order to trigger or initiate reconciliation module 222 to perform one or more data operations in order to effect the change. As used herein, "data operation" may refer to any type of computer programming or formatting operation that results in data being added, deleted, modified, replaced, changed, reordered, joined, shifted, or the like, without limitation or restriction to any particular type of database or data schema operation. As described in greater detail below, reconciliation may be performed on a schedule, intermittently, infrequently, frequently, periodically, rapidly, or on any type of schedule or random occurrence, without limitation or restriction. Reconciliation, in some examples, is used to ensure that host groups and clusters of servers managed by application 202 store updated data and data files, or copies thereof, in order to provide accurate and updated information in response to queries. Various types of programming and formatting languages may be used to implement reconciliation module 222 (or any of the elements shown in FIGS. 1 and 2), including Scala, or others, without limitation or restriction. In other examples, application 202 and the above-described elements may be implemented differently, with variations in function, order, procedure, and process, without limitation to any of the examples or accompanying descriptions.

Figure 3:
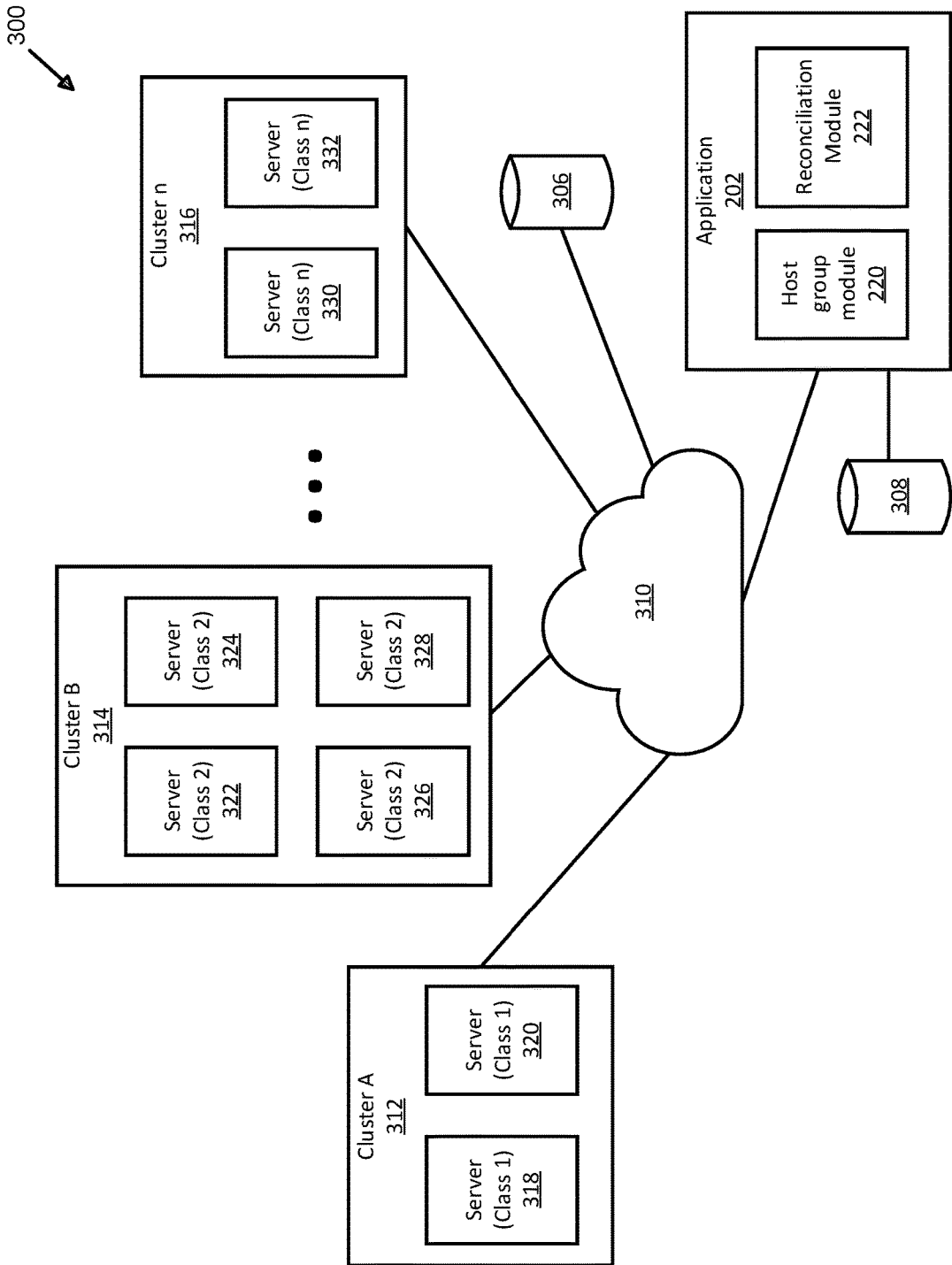
FIG. 3 illustrates an exemplary host group and server cluster configuration for temporal optimization of data operations using distributed server and shard management.

FIG. 3 illustrates an exemplary host group and server cluster configuration for temporal optimization of data operations using distributed server and shard management. Here, computing environment 300 includes application 202 (FIG. 2), cluster/host group module 220 (FIG. 2), reconciliation module 222 (FIG. 2), databases 306-308, data network 310, clusters 312-316, and servers 318-332. In some examples, application 202 may be implemented similarly to the examples shown and described above. Similarly cluster/host group module 220 and reconciliation module 222 may also be implemented functionally and structurally in a substantially similar manner to that described above in connection with FIG. 2. In other examples, application 202, cluster/host group module 220, and/or reconciliation module 222 may be implemented functionally and/or structurally differently than the examples shown and described above in connection with FIG. 2.

Referring back to FIG. 3, databases 306 and 308 may be placed in data communication with application 202, directly or indirectly. For example, application 202 may access, store, or retrieve data (among other performing other data operations) in database 306 by transferring data over data network 310. In some examples, data network 310 may be implemented as a computing cloud or distributed set of data networks that are configured to route and transfer data between application 202, databases 306-308, or servers 318-332, the latter of which may be implemented using various types and quantities of servers, without limitation or restriction. Further, application 202 may also be in data communication with database 308 in order to access, store, or retrieve data, but using a direct data communication link. Various types of data communication protocols such as transport control protocol/internet protocol (TCP/IP), hypertext transfer protocol (HTTP or HTTPS), ICMP, or others may be used and are not intended to be a specific limitation or restriction to the techniques described herein.

In some examples, data or data files accessed, stored, or retrieved by application 202 from various sources (e.g., clients 130-136 (FIG. 1)) may be stored in any of databases 306-308 or on any of servers 318-332 on clusters 312-316, which may be configured into one or more host groups by application 202 using a manifest file (not shown). Here, application 202 may invoke cluster/host group module 220 to use configuration settings and parameters in a manifest file to configure clusters 312-316 into one or more host groups. In some examples, clusters 312-316 may represent individual host groups, wherein varying types and quantities of servers are implemented. For example, cluster 312 may be implemented using servers 318-320 of a given server class (e.g., class 1). Continuing the above example, cluster 314 may be implemented using servers 322-328, which may be of a different server class than those deployed for cluster 312 (e.g., class 2). Further, cluster 316 may be implemented as another host group having servers 330-332, which may of a similar or different class than those implemented for clusters 312-314. Still further, clusters 312-316 could be grouped logically to create one or more addressable host groups. In other words, multiple clusters of servers can be grouped to create a host group and the examples shown and described are not intended to be limiting. In yet another example, more or fewer clusters and host groups using servers of similar or different classes can be implemented (i.e., deployed) and the examples shown and described are not intended to be limiting.

As shown in FIG. 3, application 202 can use cluster/host group module 220 to configure and manage one or more host groups, as described above. Further, application 202 can generate control data and signals that are intended to control, manage, and logically group, address, or otherwise organize various servers into host groups and/or clusters by partitioning (e.g., sharding, slicing, striping, and the like) server resources to store data in a temporally-optimized manner. For example, if cluster 312 includes servers 318-320, which are "class 1" servers that utilize fast, but expensive, solid state memory technologies that are capable of performing data operations at a rate faster than that of other classes (e.g., "class 2," "class n," or the like), application 202 (FIG. 2) can designate cluster 312 to store and/or process data (i.e., data files) that has "aged" beyond an initial time range. In some examples, "aging" may refer to a time characteristic such as the length of time that has transpired since a subject data file was generated, transmitted, or otherwise initially received from a source (e.g., clients 130-136). As data ages, system 300 may be configured by application 202 to move data as it ages from an initial period, for example, from server 318 to server 326 and, when further aging has occurred, to server 332. The configuration of host groups and clusters (e.g., clusters 312-316) may be performed by application 202 to optimize the use of different classes of servers (e.g., for storage, processing, or other operations) for different types of data, which may be segregated based on time characteristics such as aging. As described herein, temporal optimization of data processing and storage resources may be achieved by directing different classes of servers, which may be distinguished based on read/write/access speeds, performance, and cost, to store and/or process different types of data based on characteristics such as time characteristics (e.g., aging, time ranges, time buckets, or others). Temporal optimization storage and processing techniques described herein also enable data and data files (regardless of whether data (i.e., master versions of data and data files) or copies of data files) to be accessed and retrieved in response to queries rapidly and accurately by discretely identifying clusters and/or host groups on which requested data is stored. Further, temporal optimization may also be increased by using reconciliation, as described herein, to ensure that requested data and data files returned in response to queries are accurate and updated.

In some examples, reconciliation module 222 may be used (for example, in a Scala-implemented architecture) to perform various data operations on data stored on one or more of clusters 312-316 and servers 318-332. Data operations such as those described above may be performed by reconciliation module 222 when logic module 204 (FIG. 2) detects, in newly received data, that a change has occurred or is indicated to data previously stored. In some examples, logic module 204 may generate control data and signals to servers 318-332 to identify a location, access the location, and perform a data operation on data or data files stored at the location. In other examples, logic module 204 may generate control data and signals to create a copy of the data targeted for data operations to be performed by reconciliation module 222 in order to keep an earlier version of the data, in addition to a master version of the data as it was originally received, for various purposes such as disaster recovery, catastrophic recovery, rollbacks (i.e., rolling back stored data to an earlier state in order to pre-data a catastrophic, destructive, or corrupting event). In other examples, system 300, application 202, and the above-described elements may be implemented differently, with variations in function, order, procedure, and process, without limitation to any of the examples or accompanying descriptions.

Figure 4:
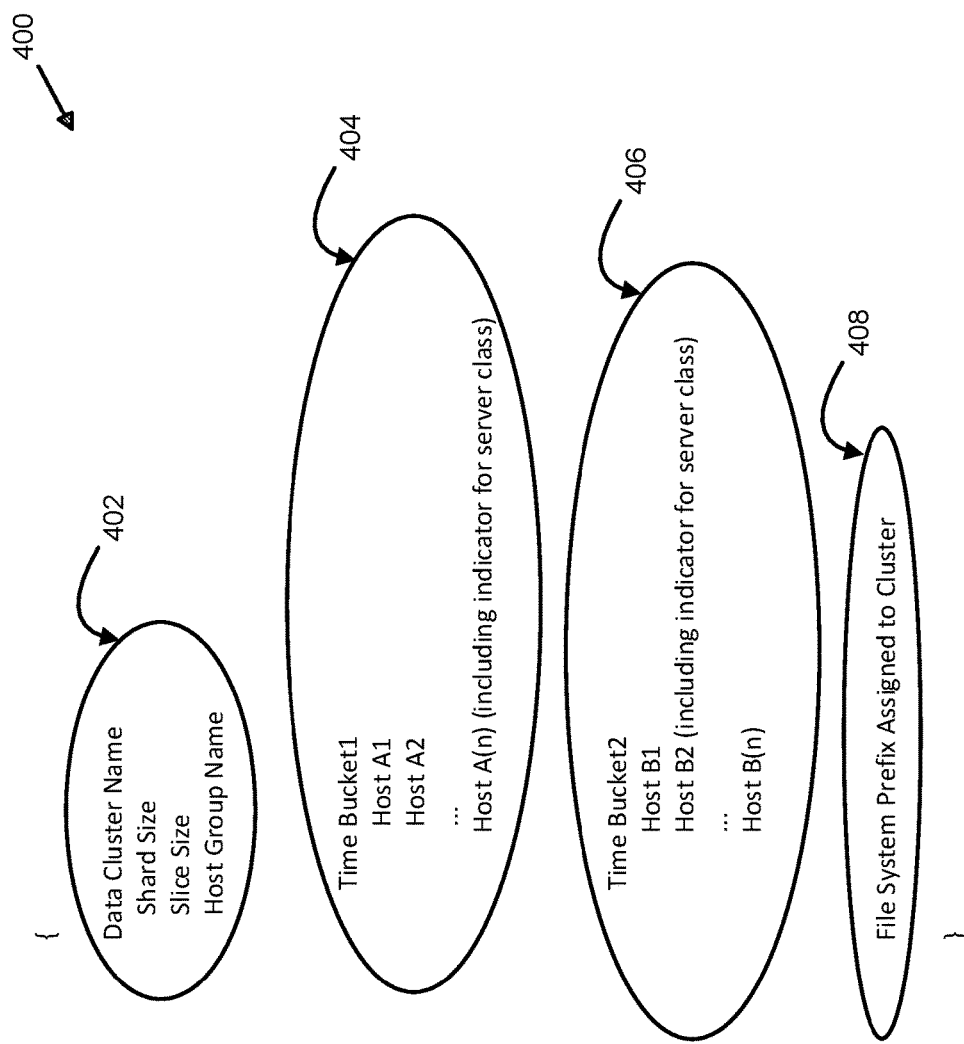
FIG. 4 illustrates an exemplary manifest file structure for temporal optimization of data operations using distributed server and shard management.

FIG. 4 illustrates an exemplary manifest file structure for temporal optimization of data operations using distributed server and shard management. As shown, data structure 400 may be an example of an implementation of a manifest file that may be used by application 102 (FIG. 1) or 202 (FIGS. 2-3) to configure one or more servers into one or more host groups and/or clusters to temporally optimize data storage, processing, and retrieval. As shown, data structure 400 includes substructure 402-408, which may be used as described below. For example, substructure 402 may be used to present parameters and settings that, when received by a server (e.g., any of those described above) are used to designate a cluster name, shard size, slice size, and one or more host group names. In some examples, substructure 404 may be used to provide parameters and settings to configure a first set of hosts within the host group based on an assigned class of servers. Likewise, substructure 406 may be used to provide parameters and settings for configuring a second group of hosts assigned, within the host group, to one or more servers that may be implemented using devices of a different class than those used for the set of hosts above (e.g., Hosts A1 through A(n) comparative, based on server class, to Hosts B1 through B(n)). Finally, substructure 408 includes a file system prefix that may be used to identify manifest file represented by data structure 400, without limitation or restriction to any particular parameters, settings, or examples shown and described. Further, the above-described exemplary data structure is intended to provide an illustrative example of how a manifest file may be implemented in various types of computer programming or formatting languages such as Java®, JavaScript, JSON, or others, without limitation or restriction. In other examples, data structure 400 and the above-described substructures 402-408 may be implemented differently, with variations in function, order, procedure, and process, without limitation to any of the examples or accompanying descriptions.

Figure 5A:
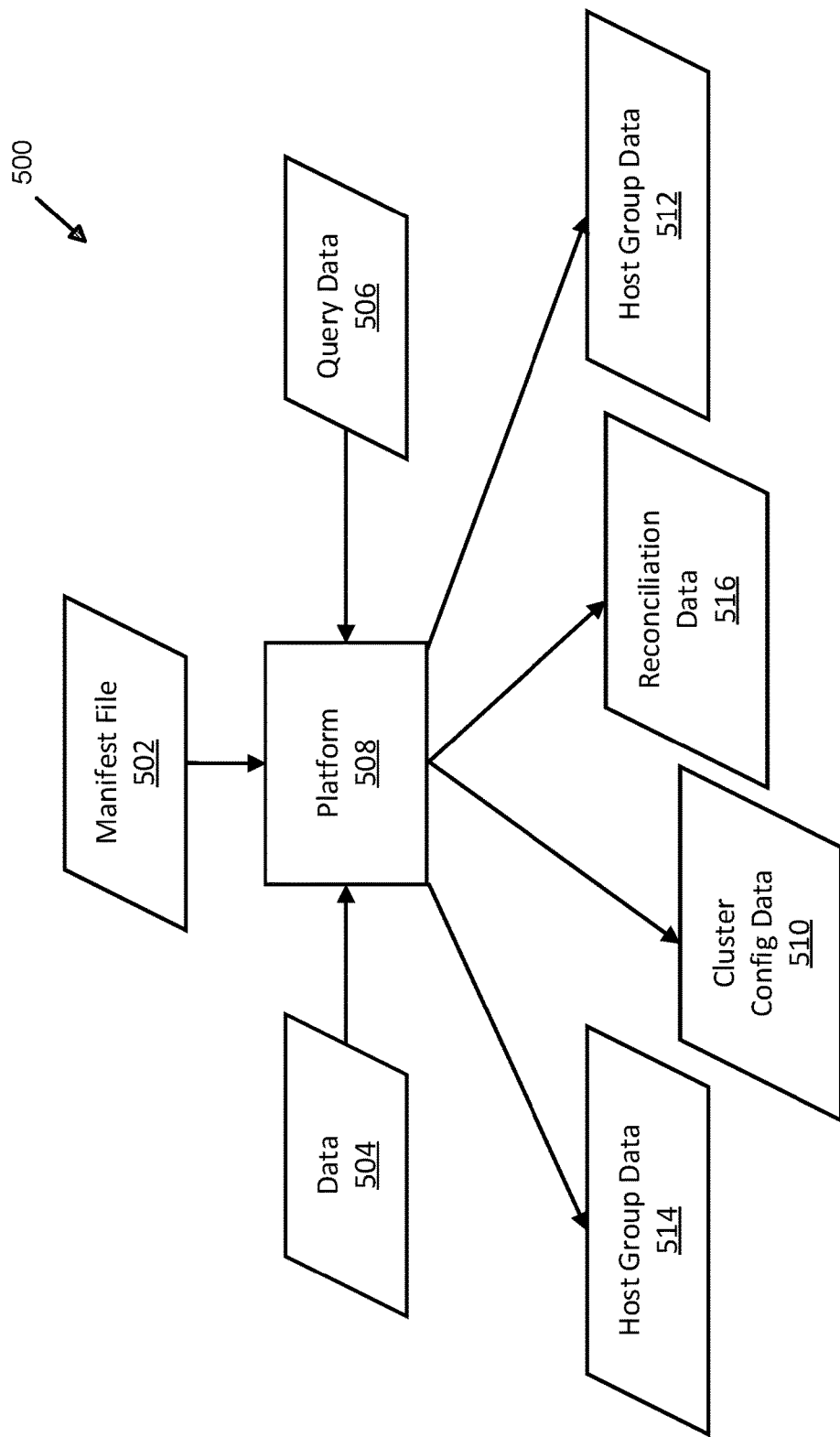
FIG. 5A illustrates an exemplary data model and flow diagram for temporal optimization of data operations using distributed server and shard management.

FIG. 5A illustrates an exemplary data model and flow diagram for temporal optimization of data operations using distributed server and shard management. Here, data model 500 includes platform 508 (i.e., which may be implemented as a process, apparatus, system, device, machine (physical or virtual; singular or multiple instances), algorithm, or as a logical set of processes or algorithms (e.g., such as a platform application or system, which may be a collection of functions implemented using, for example, various types of software, firmware, hardware, circuitry, or a combination thereof)) and data types 504-516, one or more of which may be used by platform 508 for various data operations. In some examples, data types 504-516 may include data 504, query data 506, cluster configuration data 510, host group data 512-514, and reconciliation data 516. As shown in data model 500, data 504 may be any type of data configured to be received by platform 508, which may include, but is not limited to, digital and/or analog (e.g., binary) data in any type of format or schema, including, but not limited to files, packets, segments, frames, partitions, containers, .jar files, characters, strings, text, integers, real, Boolean, alphanumeric, ASCII, RSS, or any other type beyond those listed here), or others, without limitation or restriction. Data 504 may include data from one or more other applications or clients (e.g., clients 130-136 (FIG. 1); not shown) such as social media applications, social networks, applications (e.g., other computer programs, applications, operating systems, services, or the like), content feeds, computers, servers, mobile devices such as smart phones, tablet computers, or others without limitation. As an example, data 504 may be an input stream of data to platform 508 with social data (i.e., data from social media applications, social networks, or the like) including a single or multiple data files, each of which has been assigned a time and date stamp that might be included in, for example, a packet header, footer or payload. When parsed by platform 508, a date and time may be determined and converted into a time period based on resolving the assigned time into a number of seconds, minutes, hours, or the like, as measured against a clock or clock signal (not shown) referenced by platform 508. In some examples, a "stream" (e.g., continuous output of data) of data may be continuous, contiguous, regular, irregular, infrequent, periodic, occasional, on-demand, random, or the like. Once received by platform 508, data 504 may be parsed, evaluated, and processed by platform 508, application 102 (FIG. 1), application 202 (FIG. 2), or other elements shown and described above. In some examples, when data 504 is parsed and evaluated, other types of data (e.g., query data 506, cluster configuration data 510, host group data 512-514, among others) may be generated.

In some examples, query data 506 may be received by platform 508 and, when received, may represent a query request initiated by a client (e.g., clients 130-136 (FIG. 1); not shown), application, platform, system, or other computing device, machine, or process. A query, in some examples, may be a machine or algorithmically generated request for previously stored data, irrespective of data type, content or format. When platform 508 receives query data 506, for example, parsing and evaluation may generated other data such as control signals or instructions to one or more storage locations implemented using virtual, physical, logical, cloud, or other types of storage or computing resources (e.g., storage servers). As described herein, temporal optimization of stored data may have stored the requested data at a location that is assigned to a given time range, which has been assigned to a given host group implemented using one or more server classes.

In some examples, platform 508 may rewrite or write a new query (not shown) using parsed data from query data 506 and send a rewritten request that has been targeted to a given host group based on determining a time associated with the requested data (i.e., stored data to be returned in response to the initial query). As an example, host group data 512-514 may include rewritten queries, queries generated by platform 508, or other data or signals that, when sent by application 508, or any of the elements shown and described herein, is used to executed one or more data operations on servers assigned to host groups, but which are targeted for execution based on temporal optimization and identification of time ranges in which queried data is assigned. In other words, host group data 512-514 may be issued to retrieve stored data from a given host group if, based on parsing query data 506, a given host group or servers assigned to a host group have been partitioned to encompass the time range within which the requested stored data (i.e., data may be stored on a server, shard, slice, stripe, or other type of partition based on a time of when the data was generated, transmitted, received, or otherwise assigned a given time).

Referring back to FIG. 5A, host groups and servers assigned to given time ranges for purposes of storing data in a temporally optimized manner may be configured using data, signals, or instructions included within cluster configuration data 510. In some examples, configuration of clusters, host groups, and servers may be performed, instructed, or otherwise managed by platform 508 using cluster manifest file 502 and cluster configuration data 510. As described above, cluster manifest file 502 may be illustrative of data that includes manifest files (such as those described above) that may be used to configure one or more storage and/or processing resources in order to temporally optimize the storage and retrieval of data. As shown, cluster manifest file 502 and cluster configuration data 510 may include information on cluster and host group configuration, server configuration, shard determination and configuration, server striping (hereafter "striping"), server slice determination, or other partitioning and configuration data or information that may be used to determine how to store and retrieve (or otherwise process) data. In some examples, data is stored based on a time assigned to the stored data. Resources (e.g., clusters, host groups, servers, shards, slices, stripes, partitions, or the like) may be configured to store data according to time characteristics such as time ranges. As stored data ages (as described above), platform 508 may instruct moving data from a given resource (e.g., a location, server, host group, cluster, or the like) to another resource in response to reconciliation data 516. In other words, platform 508 may provide data and instructions in reconciliation data 516 to determine whether any stored data, based on aging, should be deleted from a given resource and stored on another resource (e.g., moving data that has aged from a faster, more expensive class of server hardware to a slower, less expensive class of server hardware). In other examples, reconciliation data 516 may also include data or signals that may be used to modify, by executing various data operations (e.g., delete, copy, add, join, or others, without limitation or restriction), stored data (not shown). In other examples, data model 500 and the above-described elements may be implemented differently, with variations in function, order, procedure, or process, without limitation or restriction to any of the examples or accompanying descriptions.

Figure 5B:
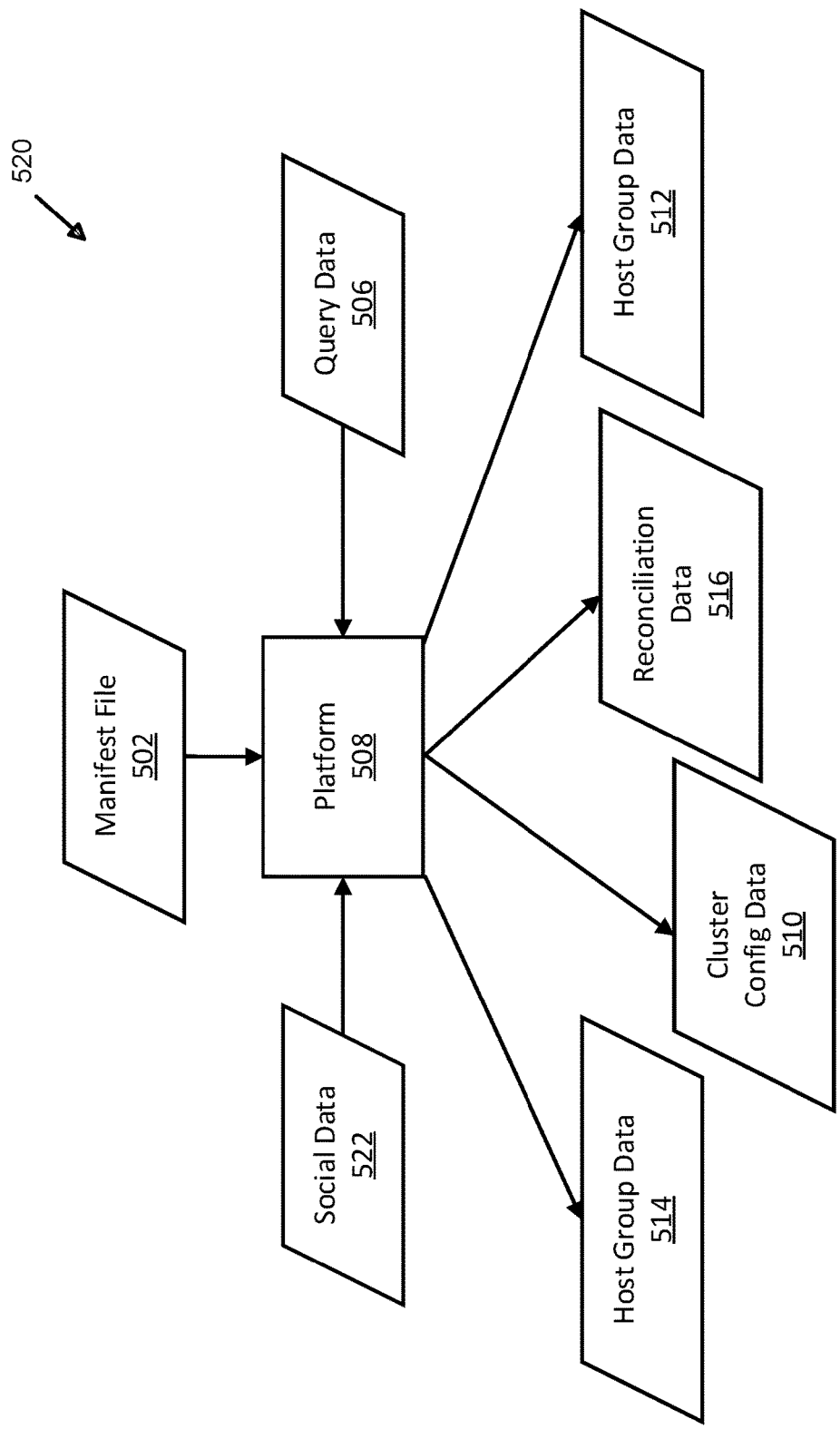
FIG. 5B illustrates an alternative exemplary data model and flow diagram for temporal optimization of data operations using distributed server and shard management.

FIG. 5B illustrates an alternative exemplary data model and flow diagram for temporal optimization of data operations using distributed server and shard management. Here, data model 520 includes platform 508 (FIG. 5A), which may be implemented in function and structure substantially similar to the like-numbered elements described above in connection with FIG. 5A (i.e., manifest file 502, query data 506, cluster configuration data 510, host group data 512-514, and reconciliation data 516. Here, social data 522 is input to platform 508 and, once parsed and evaluated, is stored in a host group. In some examples, social data 522 may be stored in a server at a location that is stored in a server index (hereafter "index"). A location (i.e., on a storage server) may be selected within a host group on a cluster of servers based on parsing and evaluating the social data to determine a time of transmission, generation, creation, receipt, or other event that, when detected by platform 508, can be used to initially store social data 522 on a server. Further, when social data 522 ages past a given time range, platform 508 can copy social data 522, delete it from the first location, and save it to another location on a different server associated with a slower class of server. In some examples, aging may refer to the amount of time that has accrued since the time of initial transmission, generation, posting, creation, placement, or other event that is considered to represent an initiating or originating time, t=0. As time passes, the time assessed to social data 522 increments in the unit of measurement (e.g., seconds, minutes, hours, days, weeks, months, years, decades, centuries, millennia, or a fraction thereof) assigned by platform 508 as a "time characteristic." When a time characteristic indicates that a given data file, packet, frame, segment, or the like has incremented so as to traverse a given time range to a different time range, platform 508 may generate data and signals to direct moving social data 522 (similarly to data 504 (FIG. 5A)) from one location to another, which may occur by performing a series of data operations, for example, to copy stored data from a given location, deleting the stored data from the location, and writing the copy to another location (e.g., "moving" stored data from a host group to another host group, from a server class to another server class, from a cluster to another cluster, from a server to another server, from a shard to another shard, from a slice to another slice, from a partition to another partition, and the like). Consequently, as data ages and is moved to temporally optimize data storage and retrieval operations, instructions to store data and queries requesting particular data (e.g., a query is received for a given content item, which may be a blog post, a news article, a news item from a feed, a video or audio file, or others, without limitation or restriction to any particular type or format of data that can be queried from a storage server or database) may be performed at decreased speeds, reducing processor demands and latency times for generating responses or returning data in response to queries. In other examples, data model 520 and the above-described elements may be implemented differently, with variations in function, order, procedure, or process, without limitation or restriction to any of the examples or accompanying descriptions.

Figure 5C:
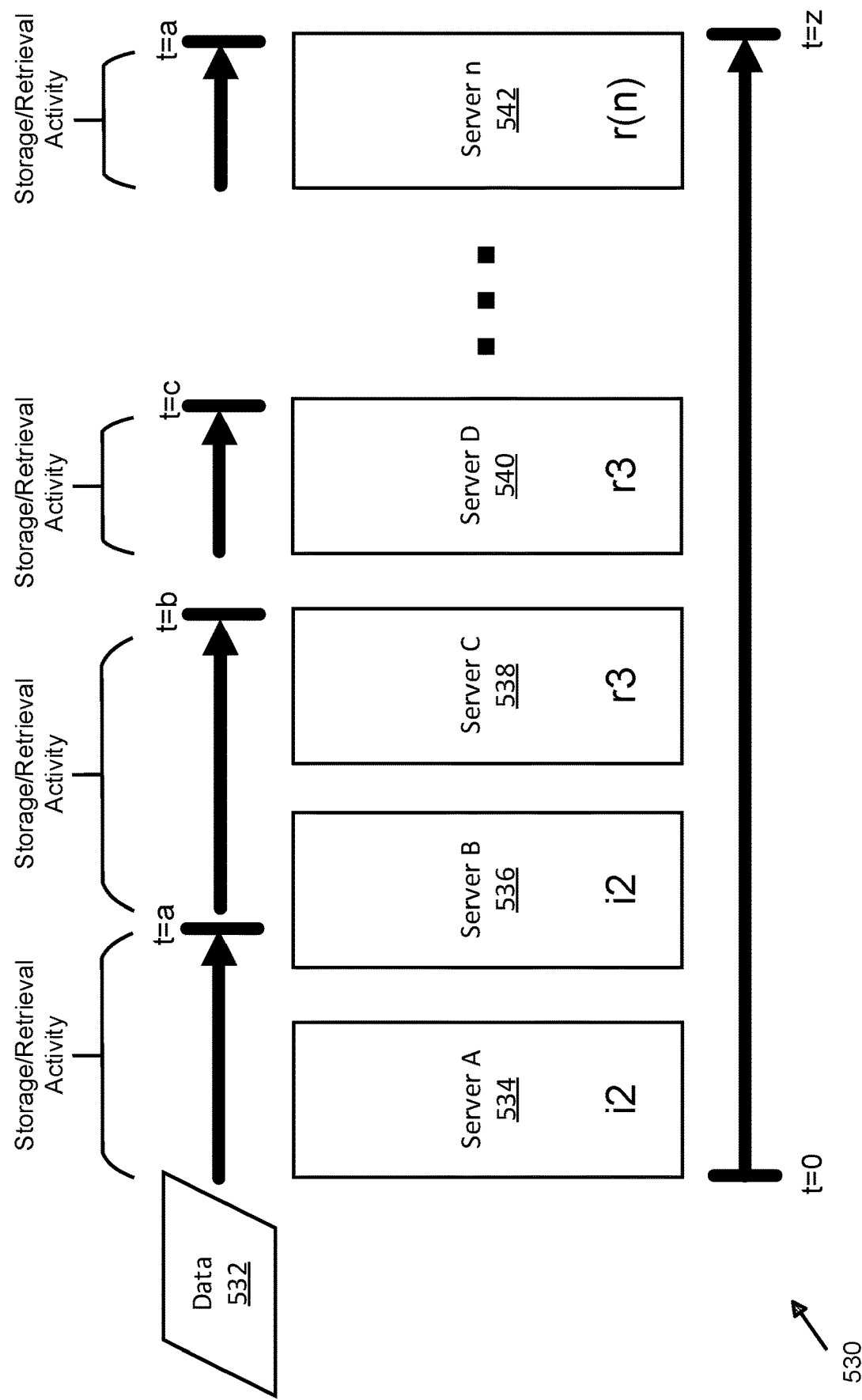
FIG. 5C illustrates a further exemplary data model and flow diagram for temporal optimization of data operations using distributed server and shard management.

FIG. 5C illustrates a further exemplary data model and flow diagram for temporal optimization of data operations using distributed server and shard management. Here, data model 530 illustrates exemplary flow of data 532 across servers 534-542, which may be implemented using different classes of servers. As shown, data 532 may be directed, instructed, or otherwise signaled (e.g., by application 102

(FIG. 1), application 202 (FIG. 2), platform 508 (FIGS. 5A-5B), or other elements such as those shown and described herein) to be stored in one or more storage servers (not shown). Here, a time scale (designed by variable "t") is shown across which storage and/or retrieval activity of data 532 occurs over servers A-n (servers 534-542), which may be implemented using different classes of servers (e.g., i2, r3, r(n), and others, without limitation or restriction as to server type or schema, including, but not limited to, physical, virtual, logical, or others).

As shown, for example, at time t=0 data 532 is stored on server 534, which may be implemented as a class "i2" server. As used herein, arbitrary designation of servers are used for purposes of illustration and the exemplary designations of server classes (e.g., i2, r3, r(n)) are not intended to be specific, limiting, or restrictive, and other server classes apart from those shown and described may be used. As used herein, "server class" or "class" may refer to a type or categorization of processing or storage server based on various attributes and characteristics such as memory technology type (e.g., solid state, random access memory (RAM), read only memory (ROM), disk drive, quantum computing, semiconductor, or others), data transfer rates, storage capacity or volume, compatibility (e.g., for use in arrays such as a redundant array of independent disks ("RAID")), or others, without limitation or restriction to any particular or specific type of class.

Here, as data 532 ages towards time t=a, data 532 may be retrieved from storage server 534 as a copy, deleted from server 534, and stored on server 536 until time t=b. At t=b, data 532 may be moved server 536 to server 538, which may be implemented as a different class of server (e.g., r3) until t=c, at which time data 532 may be moved in further data operations, as illustrated by server 542, which is representative of any number of servers and classes of servers using the techniques described herein. As used herein movement of data may refer to data retrieval operations to remove data from a location on a server, performing another data operation to delete the data from the location at the server, and performing a further data operation to write (i.e., save) the data to a new location on a different server; although the order of deleting and writing may be performed synchronously, simultaneously, in reverse order, or in no particular order. In other examples, the above-described data model 530 and corresponding flow description may be varied in process, order, or other aspects, without limitation or restriction to the examples shown and described.

Figure 6:
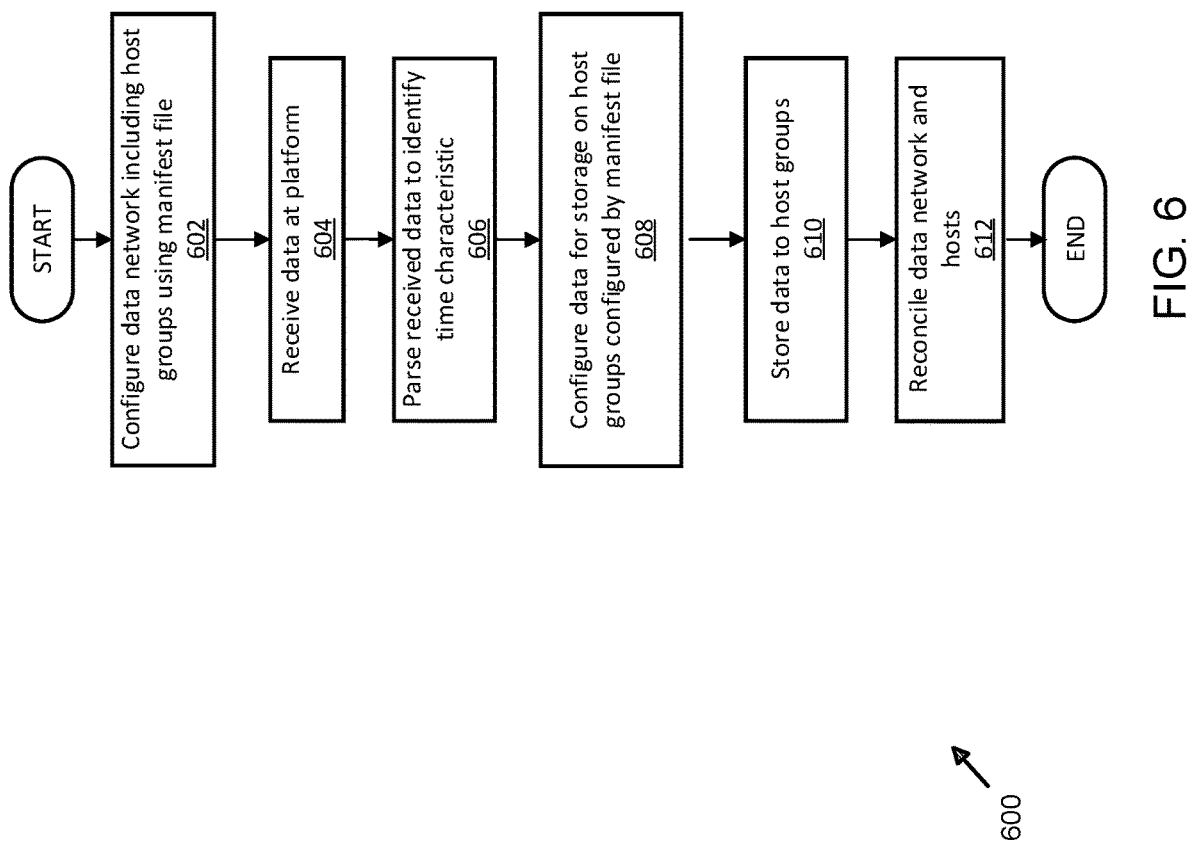
FIG. 6 illustrates an exemplary process for temporal optimization of data operations using distributed server and shard management.

FIG. 6 illustrates an exemplary process for temporal optimization of data operations using distributed server and shard management. Here, process 600 may be implemented as an algorithm, program, application, process, method, procedure, operation, or a group thereof configured to be performed by application 102 (FIG. 1), application 202 (FIG. 2), platform 508 (FIGS. 5A-5B), or another instance of the described techniques. In some examples, process 600 starts by configuring a data network using a manifest file, as described above (602). Using a manifest file, a cluster or set of clusters having one or more host groups that, in turn, have one or more servers configured for storage or processing, may be used to provide parameter and settings to configure servers to store data for temporal optimization of data operations to store and retrieve data (e.g., in response to queries). In some examples, data (which may include any type of data, such as those described herein including, but not limited to, social data) is received at a platform (e.g., platform 508 (FIGS. 5A-5B)) (604). Once received at platform 508, one or more elements such as those described above in connection with FIGS. 1-3 may be configured to parse the received data (606) to determine, for example, a time characteristic such as a time of generation, transmission, creation, or other attribute of the received data, which may be a post to a social media application or network, as an example. In other examples, data received by platform 508 (not shown) may be parsed to determine other time characteristics, parameters, or other quantitative or qualitative attributes beyond those described herein and are not limited to any specific example shown or described.

Referring back to FIG. 6, once parsed to determine a time characteristic (e.g., a time associated with an event of the data), the data may be stored to a location on one or more servers of a given server class (608). As storage resources in data communication with a platform (e.g., platform 508 (FIGS. 5A-5B) have been configured using a manifest file (not shown), the stored data is written to a location (e.g., memory location) that is either annotated or referenced by, for example, a pointer in a server index. By referencing the index, the pointer can direct queries from platform 508 to the location where requested data has been written and can be retrieved (610). Once stored, data can be reconciled, as described herein, at various, scheduled, regular, irregular, periodic, occasional, on-demand, or random time intervals (612). In other examples, the above-described process 600 may be varied in process, order, steps, sub-processes, or other aspects, without limitation or restriction to the examples shown and described.

Figure 7A:
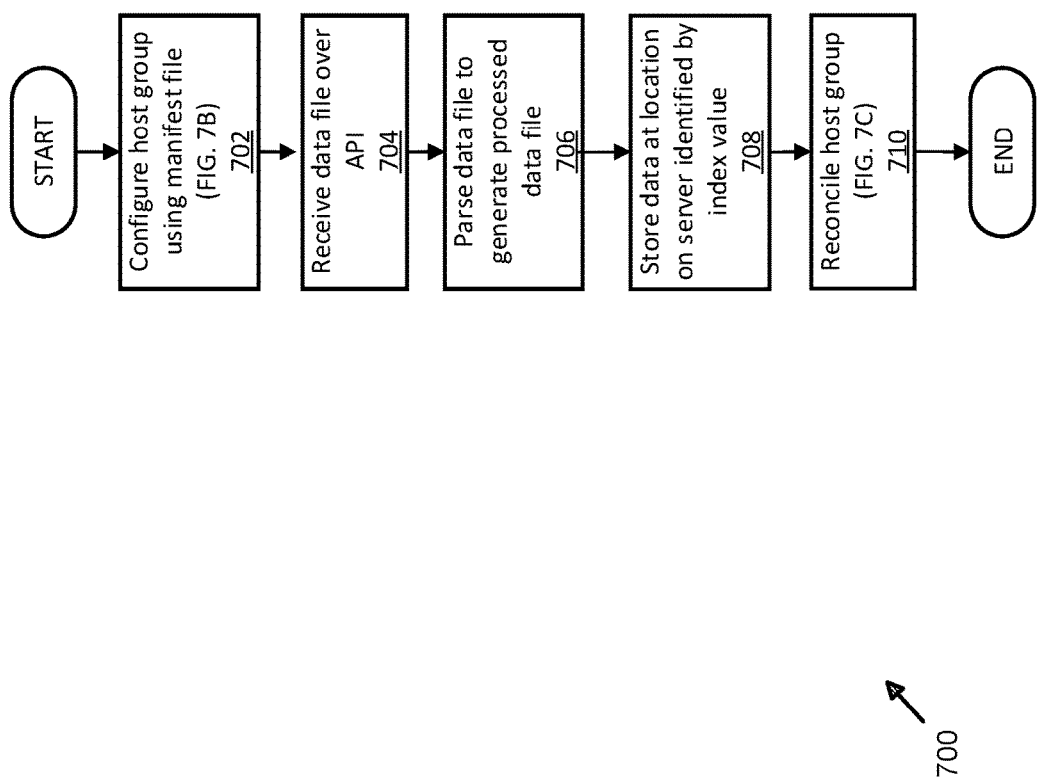
FIG. 7A illustrates another exemplary process for temporal optimization of data operations using distributed server and shard management.

FIG. 7A illustrates another exemplary process for temporal optimization of data operations using distributed server and shard management. Here, process 700 may be an alternative implementation of a temporal optimization process practicing the techniques described herein which, in some examples, may commence by configuring a host group having one or more servers (e.g., configured to provide processor or storage resources) using a manifest file as described herein (702). In some examples, configuration of server resources using a manifest file is described in further detail below in connection with FIG. 7B. Referring back to FIG. 7A, data may be received by, for example, application 102 (FIG. 1), application 202 (FIGS. 2-3), or platform 508 (FIGS. 5A-5B) over an application programming interface (hereafter referred to as "API") (704). In some examples, API may be used to provide an adapter or data communication structure to facilitate data transfer between, for example, application 102 (FIG. 1), application 202 (FIGS. 2-3), or platform 508 (FIGS. 5A-5B) and one or more applications, networks, devices, clients, computers, servers, hosts, or any other type of computing device or machine, physical or virtual, remote or local, single instance or distributed, without limitation or restriction. In other examples, multiple APIs may be implemented and the techniques described herein are not limited to any particular number of instances or specific configurations of said instances of an API.

In some examples, after receiving data from an API, the data may be parsed by application 102 (FIG. 1), application 202 (FIGS. 2-3), platform 508 (FIGS. 5A-5B), or one or more modules thereof such as those described above in connection with FIGS. 1-3. For example, logic module 104 (FIGS. 1-2) may parse received data to generate a processed data file, which may include, for example, time characteristics such as a time associated with the initial posting of a "blog" (i.e., a log configured for display on multiple devices over the World Wide Web ("Web")) entry, or a user's post to a social media site, application, or network (e.g., Instagram™, Facebook®, Snapchat®, or others), or the like (706). Once parsed and processed, received data or data files may be stored at a location on a server, host group, cluster, or a set thereof based on the assignment of the data to a given time range and, subsequently, a server class. Once stored, the location of the stored data may be referenced in an index by using various types of reference techniques such as pointers, addresses, and the like (708). Once stored, additional data may be received that, when parsed, may indicate one or more data operation that need to be performed in order to reconcile changes (710). As described herein, data may be reconciled by performing one or more data operations to delete, modify, move (e.g., as described above and in reaction to aging from an initial event such as generation, creation, initialization, posting, publishing, or others), retrieve, copy, or other operations. In other examples, the above-described process 700 may be varied in process, order, steps, sub-processes, or other aspects, without limitation or restriction to the examples shown and described.

Figure 7B:
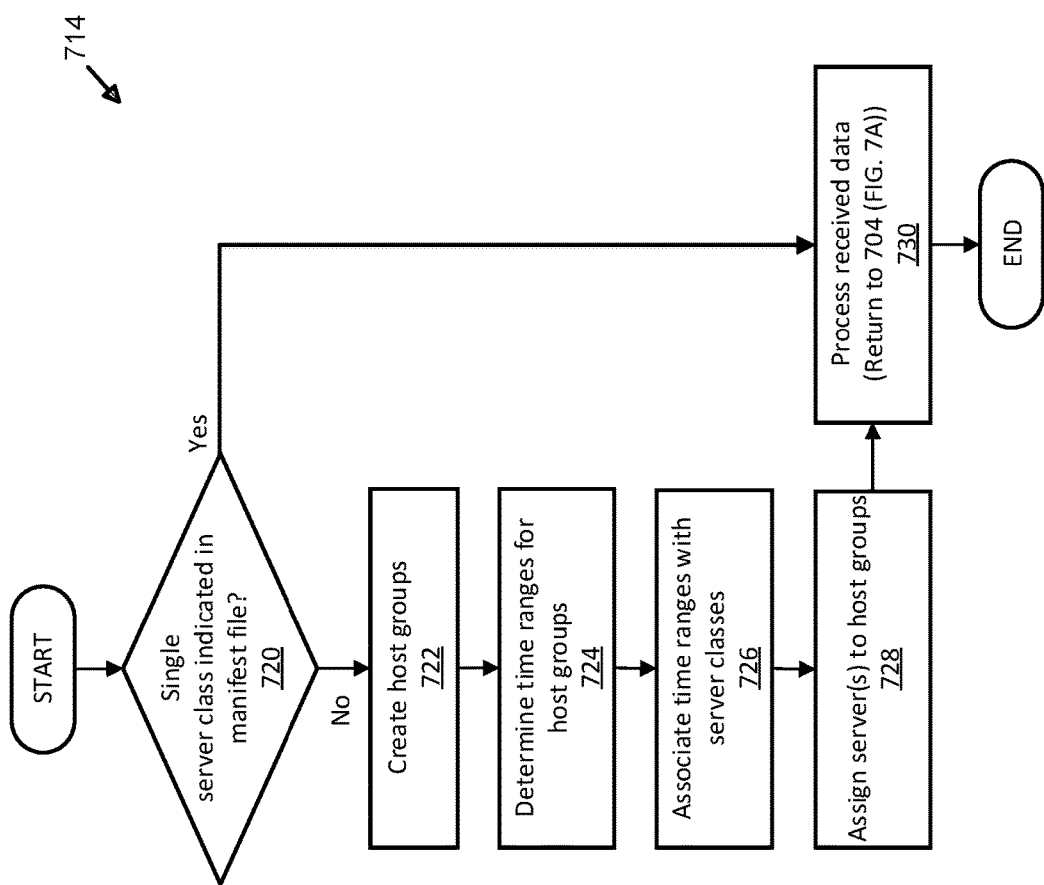
FIG. 7B illustrates an exemplary process for host group and server configuration for temporal optimization of data operations using distributed server and shard management.

FIG. 7B illustrates an exemplary process for host group and server configuration for temporal optimization of data operations using distributed server and shard management. Here, process 714 is shown and described, illustrating an exemplary process for configuring a cluster, host group, server, or a set thereof using a manifest file. Initially, a determination is made by, for example, application 102 (FIG. 1), application 202 (FIGS. 2-3), platform 508 (FIGS. 5A-5B) to determine whether multiple or a single server class is available for configuration using a manifest file (720). If multiple classes of servers are available, multiple host groups are created and configured in accordance with indicated parameters and settings in a manifest file. In some examples, available server resources may include, but are not limited to, local, distributed, or cloud-based storage and processing resources made available by service networks such as Amazon™ Web Services ("AWS") as provided by Amazon, Inc. of Seattle, Wash., among others, without limitation or restriction.

Referring back to FIG. 7B, a time range may be designated to represent a time range of data to be stored on each resource assigned to a given server class, if multiple server classes are available. In other examples, multiple time ranges may be further associated with each resource of a host group of a server class (724). In some examples, time ranges may be identified as aging (as described herein) occurs, subsequently generating, from available server resources, additional clusters, host groups, shards, and slices of different servers. Partitioning of available server resources may be performed by identifying and assigning shards and slices of each available server resource or striping server resources in order to determine how and when data is to be stored (i.e., multiple instances or a single instance of a physical or virtual (i.e., virtual machine) storage or processor-configured server) based on control data and signals generated by application 102 (FIG. 1), application 202 (FIGS. 2-3), and platform 508 (FIGS. 5A-B) (726). Here, multiple server classes may be assigned to different time ranges in order to segregate or separate stored data into different "time buckets" (i.e., ranges of time that indicate locations for data to be stored based on time characteristics associated with or determined or parsed from received data). Available server resources are then assigned to host groups configured for temporal optimization of data storage, processing, and retrieval operations (728).

Alternatively, if process 720 determines there is a single class of servers, data received by application 102 (FIG. 1), application 202 (FIGS. 2-3), platform 508 (FIGS. 5A-5B may be processed (e.g., performing any type of data operations using available server resources of the single server class, without limitation or restriction) or stored (730). Once stored, reconciliation may be performed as described herein and in connection with FIG. 7C below. In other examples, the above-described process 714 may be varied in process, order, steps, sub-processes, or other aspects, without limitation or restriction to the examples shown and described.

FIG. 7C illustrates an exemplary process for reconciliation operations for temporal optimization of data operations using distributed server and shard management. Here, process 740 begins by invoking reconciliation, which may be a single instruction or algorithm or a logical group or algorithms, programs, applications, or processes that are configured to reconcile one or more available server resources configured for temporal optimization to store or retrieve data (742). In some examples, a determination is made as to whether data being received by, for example, application 102 (FIG. 1), application 202 (FIGS. 2-3), platform 508 (FIGS. 5A-5B) indicates changes (i.e., modifications in the current state of stored data) are present (744). If received data (e.g., newly received data or data received by application 102 (FIG. 1), application 202 (FIGS. 2-3), platform 508 (FIGS. 5A-5B)) in an input stream, feed, data received after previously received data is stored, or the like) indicates no changes are to be made to stored data, process 740 ends. However, if changes are indicated by data received after the stored data was received by application 102 (FIG. 1), application 202 (FIGS. 2-3), platform 508 (FIGS. 5A-5B), or a sub-module thereof (e.g., modules such as those indicated in FIGS. 1-3), then the type of change is determined by parsing the received data (746).

In some examples, determining the type of change that has occurred to previously stored data may include identifying one or more data operations to be performed on stored data. Once the type(s) of change has been determined and one or more data operations associated with enacting the indicated change(s) has also been determined, a server index may be referenced to determine a location associated with the targeted stored data. After determining the location of the stored data targeted for change (i.e., modification) by referencing a pointer, address, or other locating information included within a data structure configured as a server index ("index"), the associated data operation(s) are performed (748). As used herein, data operation may refer to any type of algorithmic, digital, software, method, or process that can modify data, regardless of programming language, format, or application architectural level (e.g., various levels of an application "stack" as identified in various types of models such as the Open Systems Interconnect ("OSI") model).

In some examples, performance of a data operation may include identifying a location of stored data indicated for change by received data (i.e., data received after the target data was stored), copying the stored data in its unmodified state to a cache, buffer, or temporary memory location, performing the data operation on the copy of the stored data, and storing the modified stored data to the original location from which the data was retrieved or to a different location, if specified by data received by application 102 (FIG. 1), application 202 (FIGS. 2-3), platform 508 (FIGS. 5A-5B), or a sub-module thereof (e.g., modules such as those indicated in FIGS. 1-3) (750). In other examples, the above-described process 740 may be varied in process, order, steps, sub-processes, or other aspects, without limitation or restriction to the examples shown and described.

Figure 8A:
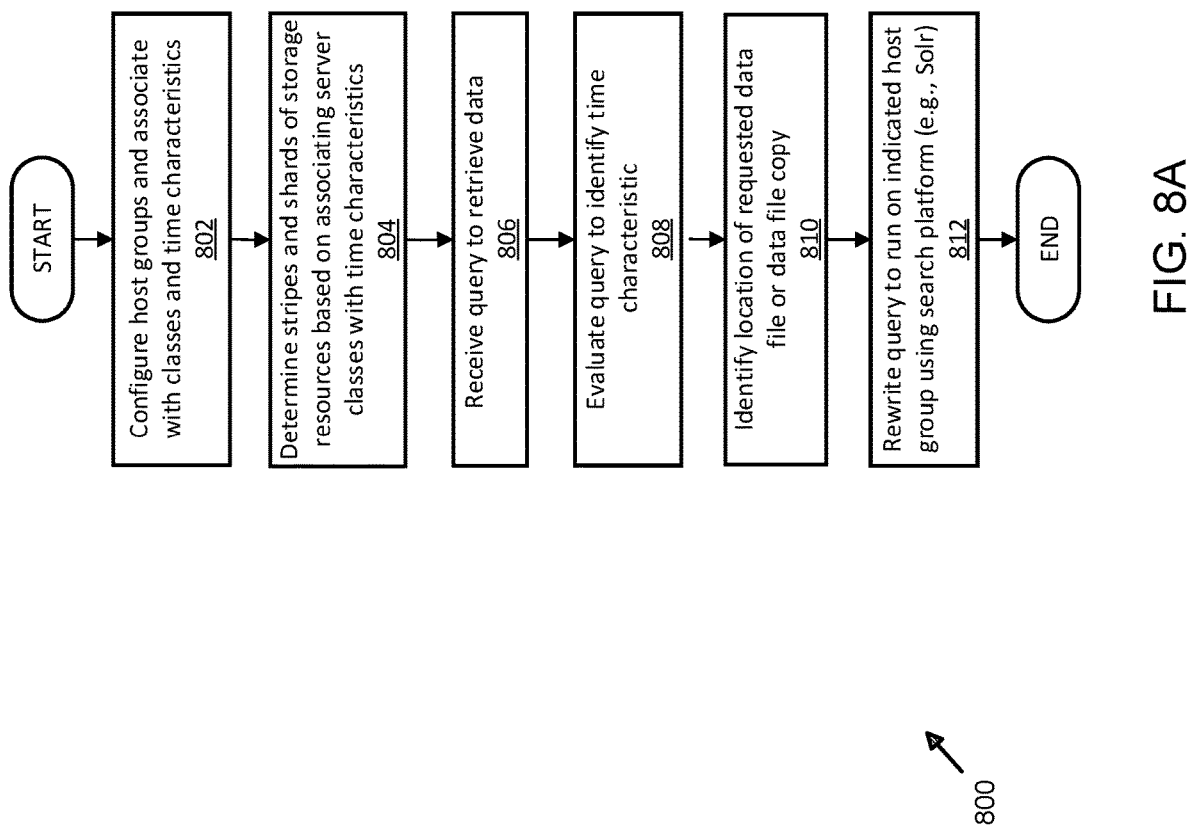
FIG. 8A illustrates an alternative exemplary process for temporal optimization of data operations using distributed server and shard management.

FIG. 8A illustrates an alternative exemplary process for temporal optimization of data operations using distributed server and shard management. Here, process 800 may be implemented as an alternative implementation or embodiment of process 700 described above in connection with FIG. 7A. In some examples, process 800 starts by configuring clusters, host groups, and available server sources (e.g., individual or multiple instances of servers (physical, virtual, or logical), server classes, or the like) by making assignments based on time characteristics. As described above, available server resources and server classes may be assigned based on time characteristics such as time ranges into which stored data can be grouped (802). As shown, striping of available server resources and generation and assignment of shards (as described above) may be assigned to available storage resources based on time characteristics (804). A query requesting data retrieval may be received by application 102 (FIG. 1), application 202 (FIGS. 2-3), platform 508 (FIGS. 5A-5B), or a sub-module thereof (e.g., modules such as those indicated in FIGS. 1-3) (806). As shown, when a query requesting data retrieval of stored data is received, it is further parsed and evaluated to identify a time characteristic (e.g., a time range in which the requested data was stored) associated with the stored data (808). For example, a received query may indicate that a news article posted eighteen (18) hours earlier is being requested by another client, application, system, or the like, which, once identified, indicates that a given time range and assigned host group and its corresponding server resources (which may be of one or more server classes) is to be searched. As another example, a query is received requesting a copy of a stored data feed in which various clients are posting different types of content (e.g., content, still images, burst image files, video, audio, or others, without limitation or restriction) to be copied and, further, additional data related to the stored data and which is being stored is to also be copied in real-time or near real-time and returned in response to the query continuously. Other examples may be envisioned by those of ordinary skill in the art, and are not intended to be limited or restricted to the examples shown and described herein.

After identifying a time characteristic associated with the stored data sought to be retrieved in response to a query, in some examples, a location is determined to identify one or more server resources on which the stored data is housed (810). Upon identifying a location(s) of the stored data to be retrieved, application 102 (FIG. 1), application 202 (FIGS. 2-3), platform 508 (FIGS. 5A-5B), or a sub-module thereof (e.g., modules such as those indicated in FIGS. 1-3) generates (i.e., rewrites the initial query) a request to the location to copy the stored data to a cache, buffer, or other temporary or permanent memory location, which may be collectively referred to as "retrieval" (812). As used herein, when a query is rewritten, as an example, a request to a storage server location (i.e., "location") may be formatted based on the class and data storage schema of the location, but also targeted at a given cluster, host group, and/or server based on comparing the determined time characteristic with one of the indexed time ranges associated with available server resources. By comparing the time characteristic of the requested stored data and identifying a time range within which the stored data is likely to be stored, server resources assigned to time ranges inside or outside that of the stored data may be excluded, thus preventing unnecessary server and processor resources being consumed. As another example, a precise location of data being requested by a given query may not be readily identified within a server index. However, by parsing the query to determine a characteristic for the data sought, an enveloping time range can be identified and, once identified, assigned server resources can be searched in a targeted manner avoiding expending processor and computing sources on unrelated server resources, which not only reduces latency in returning accurate results in response to queries, but also improves the allocation of server resources to storage of large amounts of stored. In some examples, when stored data requested for retrieval is copied into a cache, buffer, or other temporary or permanent memory location, a copy may be maintained for disaster or catastrophic recovery or rollback (i.e., resetting a state of a memory device to a previous state in order to restore data from a destructive, catastrophic, or corrupting event) purposes. In other examples, when stored data is requested for retrieval in response to a query, a copy is made to a cache, buffer, or other temporary or permanent memory location and then the stored data is deleted from the location. In still other examples, stored data may be handled differently and is not limited to the specific examples shown and described. In other examples, the above-described process 800 may be varied in process, order, steps, sub-processes, or other aspects, without limitation or restriction to the examples shown and described.

Figure 8B:
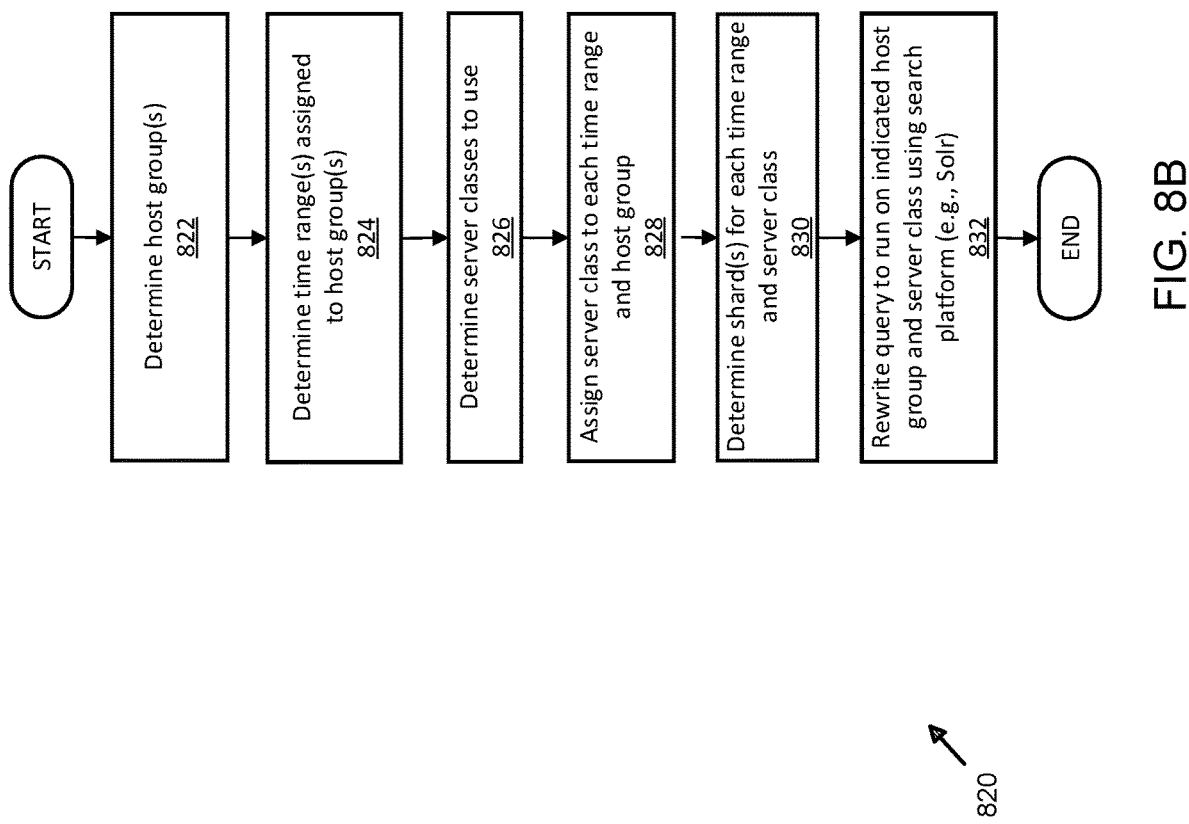
FIG. 8B illustrates an exemplary process for temporally optimized data retrieval using distributed server and shard management.

FIG. 8B illustrates an exemplary process for temporally optimized data retrieval using distributed server and shard management. Here, process 820 starts by determining clusters and host groups to be configured (822). Upon determining the number and configuration of clusters and/or host groups to be configured, application 102 (FIG. 1), application 202 (FIGS. 2-3), platform 508 (FIGS. 5A-5B), or a sub-module thereof (e.g., logic module 104 (FIGS. 1-2)) determines times ranges to assign to each host group or, in some examples, individual hosts, or sub-host groups (824). Next, a determination is made as to which server classes are available (826). Once available server classes have been determined, server classes are assigned to host groups, individual hosts, or sub-host groups being temporally optimized for data retrieval (828). Once assigned, shards may be determined for assigned to various time ranges assigned to host groups (830). In other words, some shards may be implemented using one or multiple server resources (e.g., physical, virtual, or logical) of a single or multiple server classes. Logically, shards may be assigned to a given time range and server class, but actually implemented using a server resource or a fraction thereof, in some examples.

After configuring cluster(s), host group(s), server resources, and shards, a query requesting stored data may be rewritten in the data schema, format, or programming or formatting language of databases installed the elements set forth above (832). In some examples, queries may also be rewritten in order to be executed using a given search facility, application, platform, or system. For example, queries may be rewritten by query manager 114 (FIG. 2) in order to transform a query from a web-input, text-based submission from one or more of clients 130-136 (FIG. 1) into a query request in Solr, which may be used as an enterprise-level search platform. When rewritten, a Solr query may be run against various, disparate databases and server resources within a given time range in order to locate, retrieve (as discussed above), and return targeted stored data in response to the original request. By using an enterprise-level search platform (e.g., Solr) that is configured to search various, disparate databases and data structures deployed on server resources that have been configured to store data on host groups supporting different server classes, latency is decreased and accuracy is increased in return stored data in response to queries by avoiding the need to search all server resources deployed for a given cluster or host group. In other examples, the above-described process 820 may be varied in process, order, steps, sub-processes, or other aspects, without limitation or restriction to the examples shown and described.

Figure 8C:
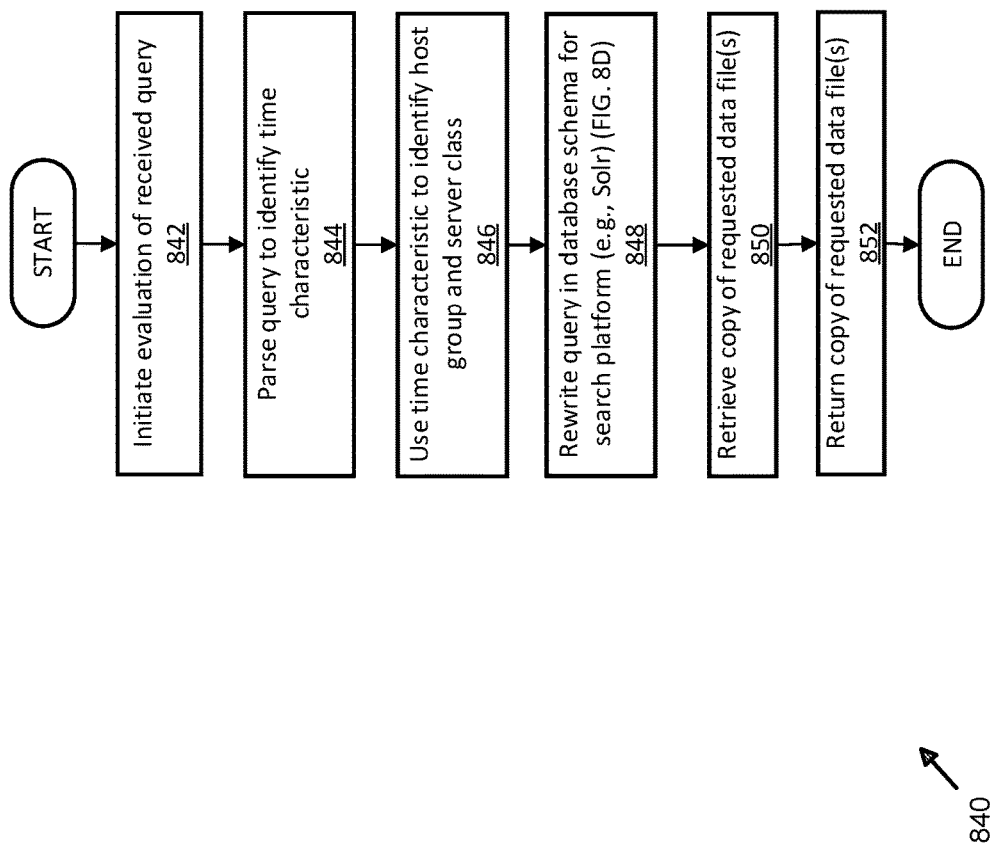
FIG. 8C illustrates an exemplary process for temporally optimized data queries using distributed server and shard management.

FIG. 8C illustrates an exemplary process for temporally optimized data queries using distributed server and shard management. Here, process 840 starts by logic module 104 (FIGS. 1-2) initiating evaluation of a query received by, for example, application 102 (FIG. 1), application 202 (FIGS. 2-3), platform 508 (FIGS. 5A-5B), or a sub-module thereof (e.g., logic module 104 (FIGS. 1-2)) (842). Once initiated, query manager 114 (FIGS. 1-2) parses the received query to identify one or more time characteristics (844). Once determined, the identified time characteristics may be used by logic module 104, class manager 216 (FIG. 2), and cluster/host group module 220 (FIG. 2) to identify a given host group and one or more server resources and classes assigned to the host group on which the requested data is likely stored (846). In some examples, search platform 112 (FIGS. 1-2) may be configured to rewrite and execute a received query in a data schema and format of a given host group, server, or class as identified in sub-process 846 above (848), which is described in greater detail below in connection with FIG. 8D.

In some examples, when a rewritten query is executed by search platform 114 (e.g., in Solr or another enterprise-level search language or format), a copy of the data being sought by the query is retrieved (850). Once retrieved, the copy of the requested data is returned in response to the request in a format and language (e.g., HTML, XML, Java®, JavaScript, command line interface, binary, or any other type of programming or formatting language that may be used to display data) to the client that initiated the query (852). In other examples, the above-described process 840 may be varied in process, order, steps, sub-processes, or other aspects, without limitation or restriction to the examples shown and described.

Figure 8D:
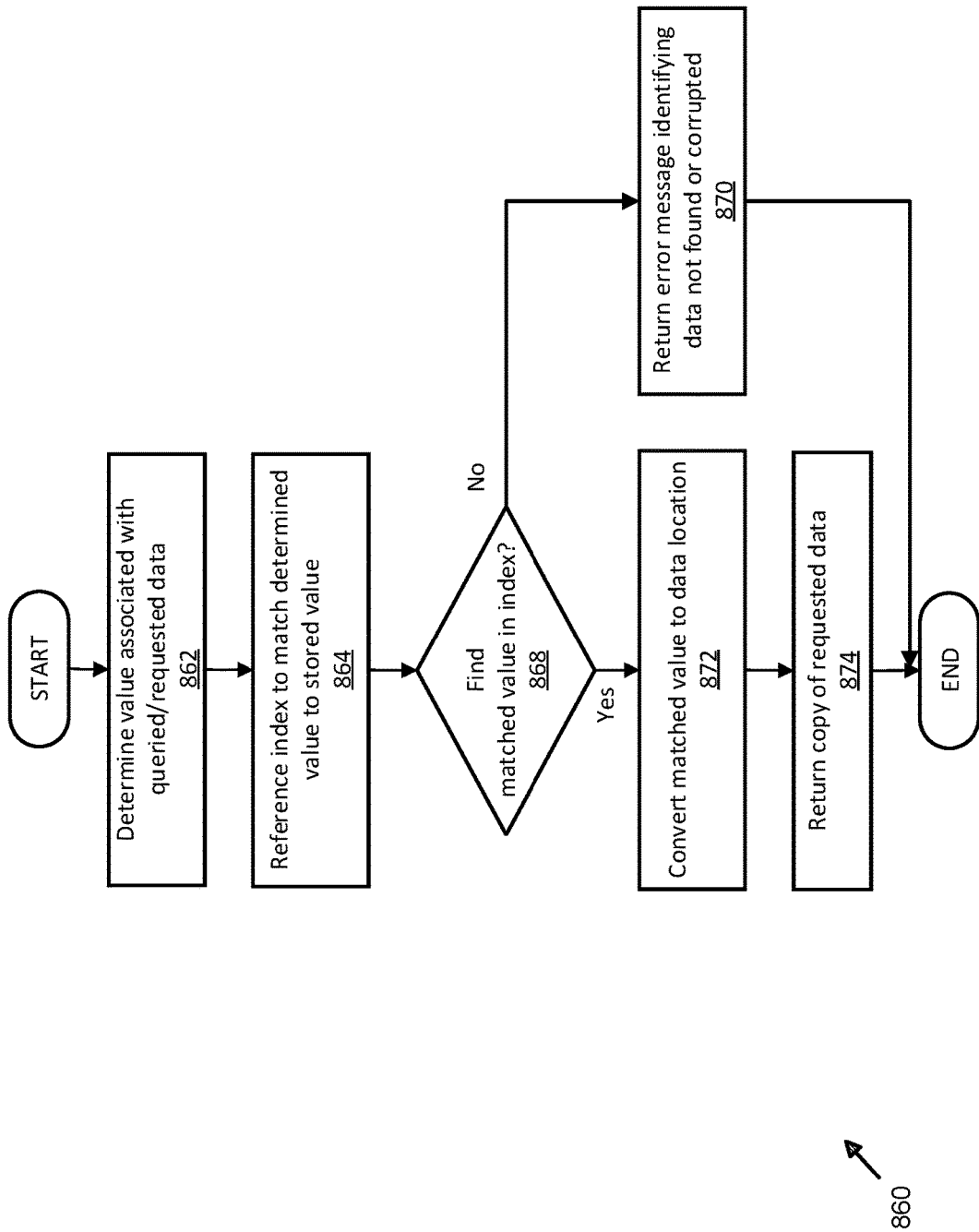
FIG. 8D illustrates an exemplary process for retrieving temporally optimized data using distributed server and shard management.

FIG. 8D illustrates an exemplary process for retrieving temporally optimized data using distributed server and shard management. Here, an exemplary process 860 for rewriting queries using a search platform (e.g., search platform 112 (FIGS. 1-2)) is shown and described. In some examples, a query is evaluated to determine a value associated with the queried or requested data (862). For example, a query may request stored data has an assigned value such as a hash value or index value that, when matched with a value in a query, enables requested stored data to be located rapidly without searching all server resources to find a complete and comprehensive match of each element of the stored data. In other words, instead of performing a search of all stored data to located a requested data file or set of data, data, when stored, may also be hashed or transformed into a value that is stored in an index file. When a query is executed a value is submitted to be matched in order to identify a location from which to retrieve stored data to return in response to the query.

Here, the value determined from a received query is used to reference an index to determine a match to locate stored data to be returned in response to a query (864). In some examples, a determination is then made to determine if a value in the index matches the value parsed from the original query (868). If not match is found, an error message may be returned and the process ends (870). If a match is found, then the matched value is converted into the data schema for the server resource on which the requested data is stored (872). The requested data is then retrieved and returned in response to the original query (874). In other examples, the above-described process 860 may be varied in process, order, steps, sub-processes, or other aspects, without limitation or restriction to the examples shown and described.

Figure 8E:
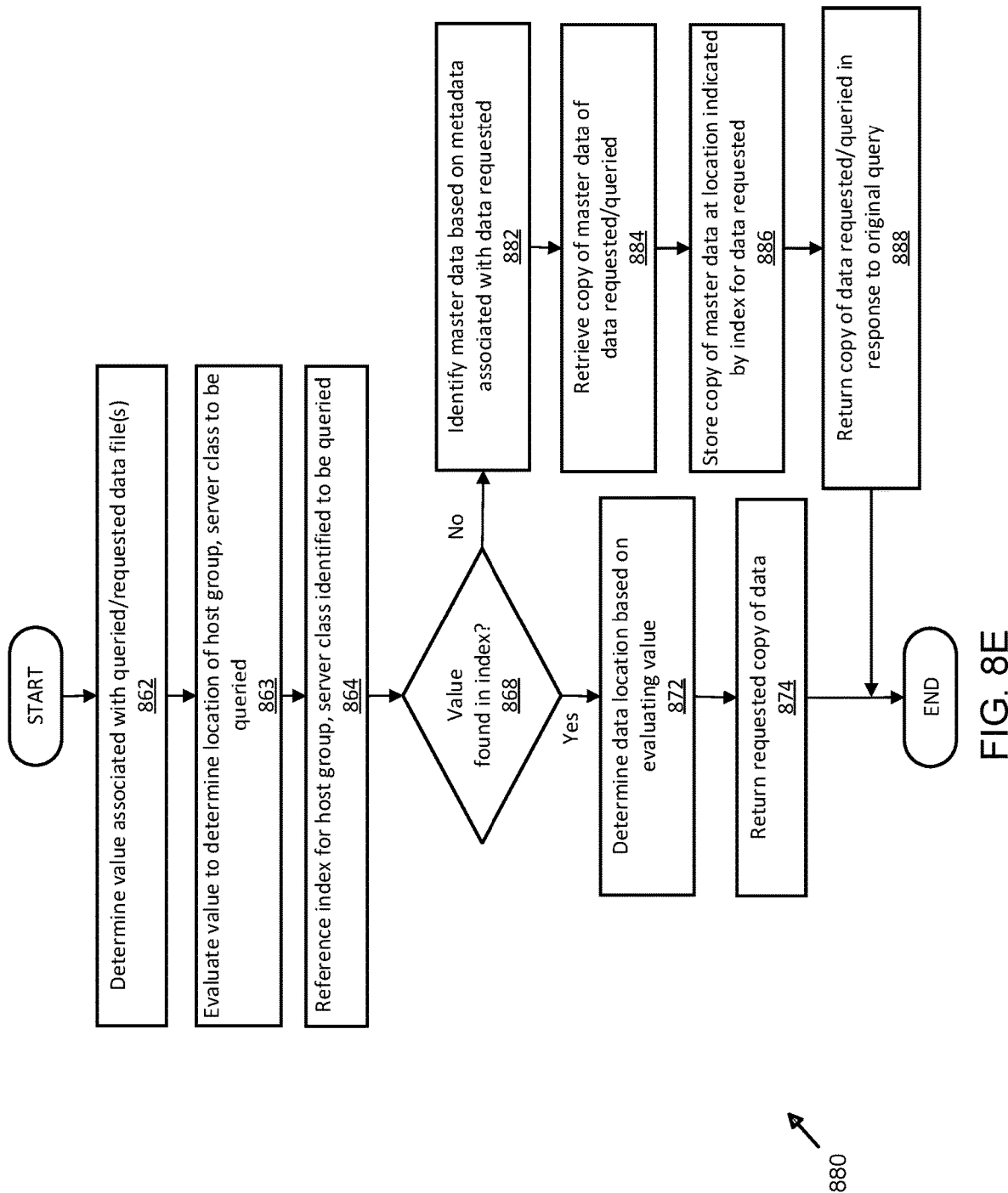
FIG. 8E illustrates an alternative exemplary process for retrieving temporally optimized data using distributed server and shard management.

FIG. 8E illustrates an alternative exemplary process for retrieving temporally optimized data using distributed server and shard management. Here, process 880 illustrates an alternative process for rewriting and executing a query in a database format or schema for a target server resource. In some examples, several sub-processes of process 880 may be similar to those described above in connection with FIG. 8D. For example, when a query is received, it is evaluated to determine or identify a value associated with or indicated of the data requested (862; FIG. 8D). Once a value has been determined, a location associated with the value is identified to the extent that a host group and/or a server class are identified for querying (863). Once a host group and a server class have been identified, an index associated with the host group can be referenced with the value to find a matching value that provides a location of the requested data (864; FIG. 8D). In some examples, a determination is made as to whether the value is found in the referenced index (868; FIG. 8D). If a match is found, a given location may be found using, for example, an address, pointer, or other indexing information associated with the matched value (872; FIG. 8D). A copy of the data may be retrieved from the location and returned in response to the original request (874; FIG. 8D). However, unlike FIG. 8D, when a value is not found to match another value in an index, a different process may be invoked.

In some examples, when a value parsed from a query does not have a corresponding matching value in an index for a server resource(s) assigned to a host group assigned to a time range in which the requested data is stored, a master copy of the requested data may be located using metadata parsed from the original query. For example, a query may be parsed to identify various types and formats of metadata that may be used to identify data requested. Using the metadata, a search may be performed of the host group and associated server resources to locate a master copy of the requested data (882). Once located, a copy of the master data (or master data file(s)) may be retrieved (884). Once retrieved, in some examples, a data operation to reconcile the stored data may be performed by storing a copy of the master data at the location indicated by the index (886). After storing the copy of the master data at the location where the queried data should have been stored (i.e., but was damaged or deleted), another copy of the master data is returned in response to the original query (888). In some examples, the above-described process 880 may be used to replace, modify, fix, replace, address, write, or otherwise save data to a location that may have been corrupted for various reasons, including, but not limited, to power outages, disasters, catastrophic loss, server damage, corrupted memory or data structures, or others. In other examples, when data stored on a server resource does not match a state indicated by an index, process 880 may be used to restore stored data to an uncorrupted or undamaged state. In other examples, the above-described process 880 may be varied in process, order, steps, sub-processes, or other aspects, without limitation or restriction to the examples shown and described.

Figure 9:
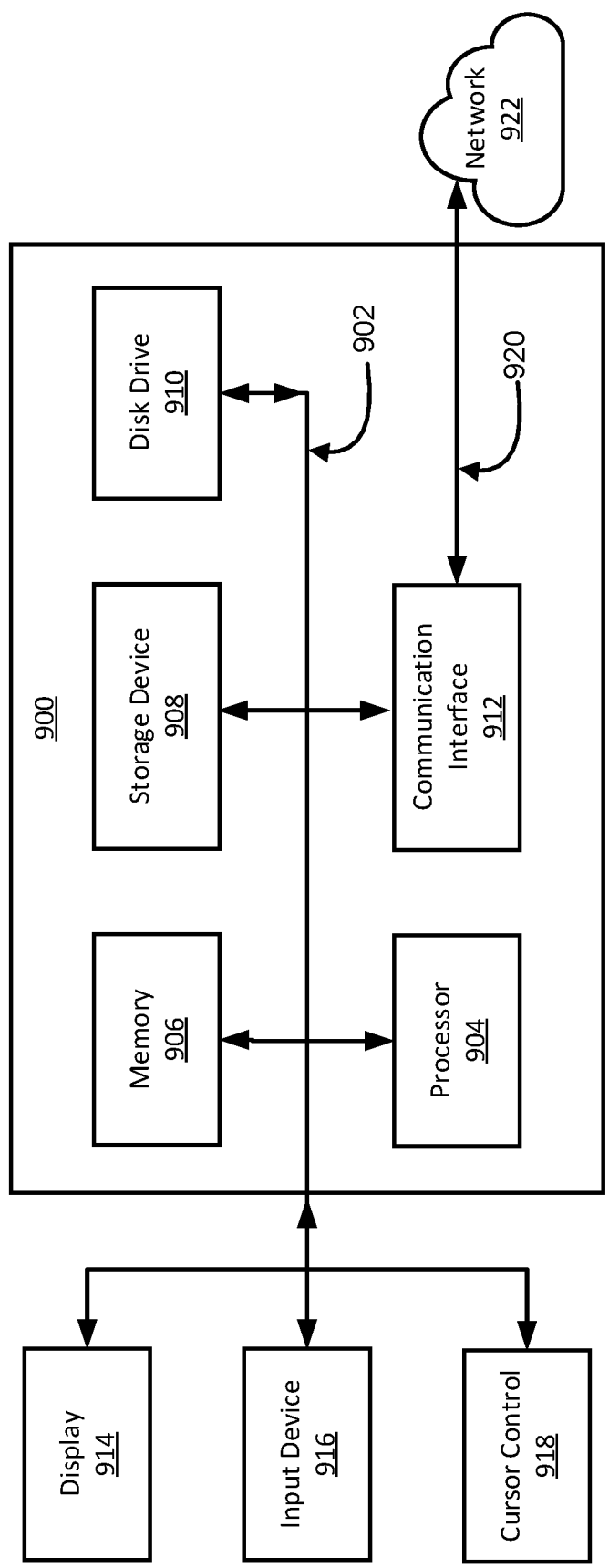
FIG. 9 illustrates an exemplary computing system suitable for temporal optimization of data operations using distributed server and shard management.

FIG. 9 illustrates an exemplary computing system suitable for temporal optimization of data operations using distributed server and shard management. In some examples, computer system 900 may be used to implement computer programs, applications, methods, processes, or other software to perform the above-described techniques. Computing system 900 includes a bus 902 or other communication mechanism for communicating information, which interconnects subsystems and devices, such as processor 904, system memory 906 (e.g., RAM), storage device 908 (e.g., ROM), disk drive 910 (e.g., magnetic or optical), communication interface 912 (e.g., modem or Ethernet card), display 914 (e.g., CRT or LCD), input device 916 (e.g., keyboard), cursor control 918 (e.g., mouse or trackball), communication link 920, and network 922.

According to some examples, computing system 900 performs specific operations by processor 904 executing one or more sequences of one or more instructions stored in system memory 906. Such instructions may be read into system memory 906 from another computer readable medium, such as static storage device 908 or disk drive 910. In some examples, hard-wired circuitry may be used in place of or in combination with software instructions for implementation.

The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks, such as disk drive 910. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by a single computer system 900. According to some examples, two or more computing system 900 coupled by communication link 920 (e.g., LAN, PSTN, or wireless network) may perform the sequence of instructions in coordination with one another. Computing system 900 may transmit and receive messages, data, and instructions, including program, i.e., application code, through communication link 920 and communication interface 912. Received program code may be executed by processor 904 as it is received, and/or stored in disk drive 910, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   receiving data in association with an application implemented with one or more processors and memory, the application being configured to manage disparate computing and storage resources;
   accessing, by the application, a manifest file including data representing parameters to configure one or more clusters of servers to allocate storage of the data among partitioned portions of the one or more clusters of servers in accordance with the parameters specifying classes of servers and ranges of time characteristics;
   determining aging of partitioned data associated with the partitioned portions based on the classes of servers and the ranges of time characteristics;
   moving one or more subsets of the partitioned data associated with one or more of the partitioned portions to different partitioned portions of different server classes based on the aging of the partitioned data;
   receiving a query at a processor to retrieve the data stored as stored data among the among the partitioned portions;
   evaluating the query to identify a time characteristic associated with the stored data;
   identifying a location from which to retrieve the stored data based on the query to determine a partitioned portion of the different serverclasses in which the stored data resides as a function of the time characteristic; and
   rewriting the query to run on at least one server of the one or more clusters of servers.

2. The method of claim 1, wherein the data comprises social data retrieved from one or more social media applications or networks in data communication with a platform configured to the data in one or more data streams.

3. The method of claim 1, wherein the one or more clusters of servers comprises one or more host groups.

4. The method of claim 1, wherein receiving the data in association with the application comprises:
   parsing the data to determine a date and time;
   converting the date and the time to from a time period; and
   identifying the time characteristic based on the time period.

5. The method of claim 1, further comprising:
   configuring to store the data as the stored data in at least one server in a cluster of servers that is implemented as a host group.

6. The method of claim 1, further comprising:
   detecting a change in the stored data; and
   reconciling the stored data by deleting the stored data from a first server class resource associated with a prior time period and storing the stored data to second server class resource associated with a subsequent time period.

7. The method of claim 1, wherein the partitioned portions of the one or more clusters of servers are configured as time buckets.

8. The method of claim 1, wherein the partitioned portions of the one or more clusters of servers are configured as shards.

9. The method of claim 1, wherein the partitioned portions of the one or more clusters of servers further comprise subsets of the partitioned portions.

10. The method of claim 9, wherein the subsets of the partitioned portions comprise stripes.

11. The method of claim 10, further comprising:
    determining one or more stripes associated with one or more shards distributed among one or more host groups, wherein the processor determines a distribution of the one or more stripes, the one or more shards, and the one or more host groups based on an association with a class and a range of time characteristics.

12. The method of claim 1, wherein the location is identified further by comparing the time characteristic of the query to the ranges of time characteristics and the classes of servers associated with at least one host group implementing the at least one server.

13. The method of claim 1, wherein rewriting the query comprises:
configuring the query to format the query as another query configured to access a specific data structure corresponding to a server class associated with the at least one server.

14. The method of claim 1, wherein moving the one or more subsets of the partitioned data comprises:
transferring the stored data from a first storage device associated with a first cluster of servers that transfer data at a first rate to a second storage device associated with a second cluster of servers that transfer data a second rate.

15. The method of claim 14, wherein moving the one or more subsets of the partitioned data comprises:
identifying the location by comparing the time characteristic to the ranges of time characteristics to detect that the time characteristic exceeds at least one range of time characteristics.

16. A system comprising:
a memory configured to store data and executable instructions for processing at an application; and
a processor configured to execute the executable instructions to implement the application configured to:
receive data in association with the application to manage disparate computing and storage resources;
access, at the application, a manifest file including data representing parameters to configure one or more clusters of servers to allocate storage of the data among partitioned portions of the one or more clusters of servers in accordance with the parameters specifying classes of servers and ranges of time characteristics;
determine aging of partitioned data associated with the partitioned portions based on the classes of servers and the ranges of time characteristics;
move one or more subsets of the partitioned data associated with one or more of the partitioned portions to different partitioned portions of different server classes based on the aging of the partitioned data;
receive a query at a processor to retrieve the data stored as stored data among the among the partitioned portions;
evaluate the query to identify a time characteristic associated with the stored data;
identify a location from which to retrieve the stored data based on the query to determine a partitioned portion of the different server classes in which the stored data resides as a function of the time characteristic; and
rewrite the query to run on at least one server of the one or more clusters of servers.

17. The system of claim 16, wherein the data comprises social data retrieved from one or more social media applications or networks in data communication with a platform configured to the data in one or more data streams.

18. The system of claim 16, wherein the one or more clusters of servers comprises one or more host groups.

19. The system of claim 16, wherein the processor is further configured to:
configure to store the data as the stored data in at least one server in a cluster of servers that is implemented as a host group.

20. The system of claim 16, wherein the processor is further configured to:
detect a change in the stored data; and
reconcile the stored data by deleting the stored data from a first server class resource associated with a prior time period and storing the stored data to second server class resource associated with a subsequent time period.

* * * * *